US010835988B2

(12) United States Patent
Uemura et al.

(10) Patent No.: US 10,835,988 B2
(45) Date of Patent: Nov. 17, 2020

(54) FRICTION STIR WELDING TOOL AND MACHINE TOOL

(71) Applicant: Yamazaki Mazak Corporation, Niwa-gun (JP)

(72) Inventors: Kazuki Uemura, Niwa-gun (JP); Masayasu Hachiya, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 311 days.

(21) Appl. No.: 15/869,049

(22) Filed: Jan. 12, 2018

(65) Prior Publication Data
US 2018/0133833 A1 May 17, 2018

Related U.S. Application Data

(63) Continuation of application No. PCT/JP2015/086460, filed on Dec. 28, 2015.

(51) Int. Cl.
B23K 20/12 (2006.01)
G05B 19/18 (2006.01)

(52) U.S. Cl.
CPC ........ *B23K 20/1245* (2013.01); *B23K 20/122* (2013.01); *B23K 20/123* (2013.01);
(Continued)

(58) Field of Classification Search
CPC .............. B23K 20/1245; B23K 20/125; B23K 20/1265; B23K 20/1255; B23K 20/122; B23K 20/123; B23K 20/126
See application file for complete search history.

(56) References Cited

U.S. PATENT DOCUMENTS 4,673,319 A * 6/1987 Ishikawa ............... B23B 31/001
279/145
2006/0124691 A1* 6/2006 Wood ................. B23K 20/1245
228/2.1
(Continued)

FOREIGN PATENT DOCUMENTS

CN 101176944 5/2008
CN 101972892 2/2011
(Continued)

OTHER PUBLICATIONS

Chinese Office Action for corresponding CN Application No. 201580078862.9, dated Jun. 25, 2018.
(Continued)

Primary Examiner — Erin B Saad
(74) Attorney, Agent, or Firm — Mori & Ward, LLP

(57) ABSTRACT

A friction stir welding tool includes a stir pin, a pin holder, and a housing. The pin holder supports the stir pin to rotate with the stir pin around a rotation axis of the stir pin and has a front portion and a rear portion opposite to the front portion along the rotation axis. A tip end of the stir pin projects from the front portion. The housing houses the pin holder such that the pin holder is rotatable relatively to the housing. The tip end of the stir pin projects from the housing. The housing includes an engaging portion engageable with a spindle frame of a machining head such that the rear portion of the pin holder is attached to a rotation spindle of the machining head to rotate the pin holder. The rotation spindle is rotatable relatively to the spindle frame.

18 Claims, 27 Drawing Sheets

(52) U.S. Cl.
CPC .. *G05B 19/182* (2013.01); *G05B 2219/50176* (2013.01); *G05B 2219/50202* (2013.01)

(56) References Cited

U.S. PATENT DOCUMENTS

| | | | |
|---|---|---|---|
| 2007/0114263 A1 | 5/2007 | Machida et al. |
| 2008/0128472 A1 | 6/2008 | Park et al. |
| 2009/0123778 A1 | 5/2009 | Russell et al. |
| 2014/0080690 A1 | 3/2014 | Noma et al. |
| 2015/0209895 A1 | 7/2015 | Matlack et al. |
| 2015/0266148 A1 | 9/2015 | Nishida et al. |
| 2016/0346869 A1 | 12/2016 | Weigl et al. |

FOREIGN PATENT DOCUMENTS

| | | |
|---|---|---|
| CN | 104708195 | 6/2015 |
| CN | 104972219 | 10/2015 |
| DE | 102009021850 | 3/2010 |
| JP | 2003-022129 | 1/2003 |
| JP | 2003-048064 | 2/2003 |
| JP | 2004-276054 | 10/2004 |
| JP | 2007-130646 | 5/2007 |
| JP | 2007-319907 | 12/2007 |
| JP | 2009-208116 | 9/2009 |
| JP | 5404389 B2 | 10/2009 |
| JP | 2010-099785 | 5/2010 |
| JP | 2012-000698 | 1/2012 |
| JP | 2013-237104 | 11/2013 |
| JP | 2015-116608 | 6/2015 |
| WO | WO 2015/113542 | 8/2015 |

OTHER PUBLICATIONS

International Search Report for corresponding International Application No. PCT/JP2015/086460, dated Mar. 15, 2016.
Written Opinion for corresponding International Application No. PCT/JP2015/086460, dated Mar. 15, 2016.
Japanese Office Action for corresponding JP Application No. 2016-548323, dated Oct. 18, 2016 (w/ English machine translation).
Decision to Grant a Patent for corresponding JP Application No. 2016-548323, dated Feb. 7, 2017 (w/ English machine translation).
Extended European Search Report for corresponding EP Application No. 15906407.0-1016, dated Jul. 20, 2018.
EP Office Action for corresponding EP Application No. 015906407.0-1016, dated Jun. 24, 2019.

\* cited by examiner

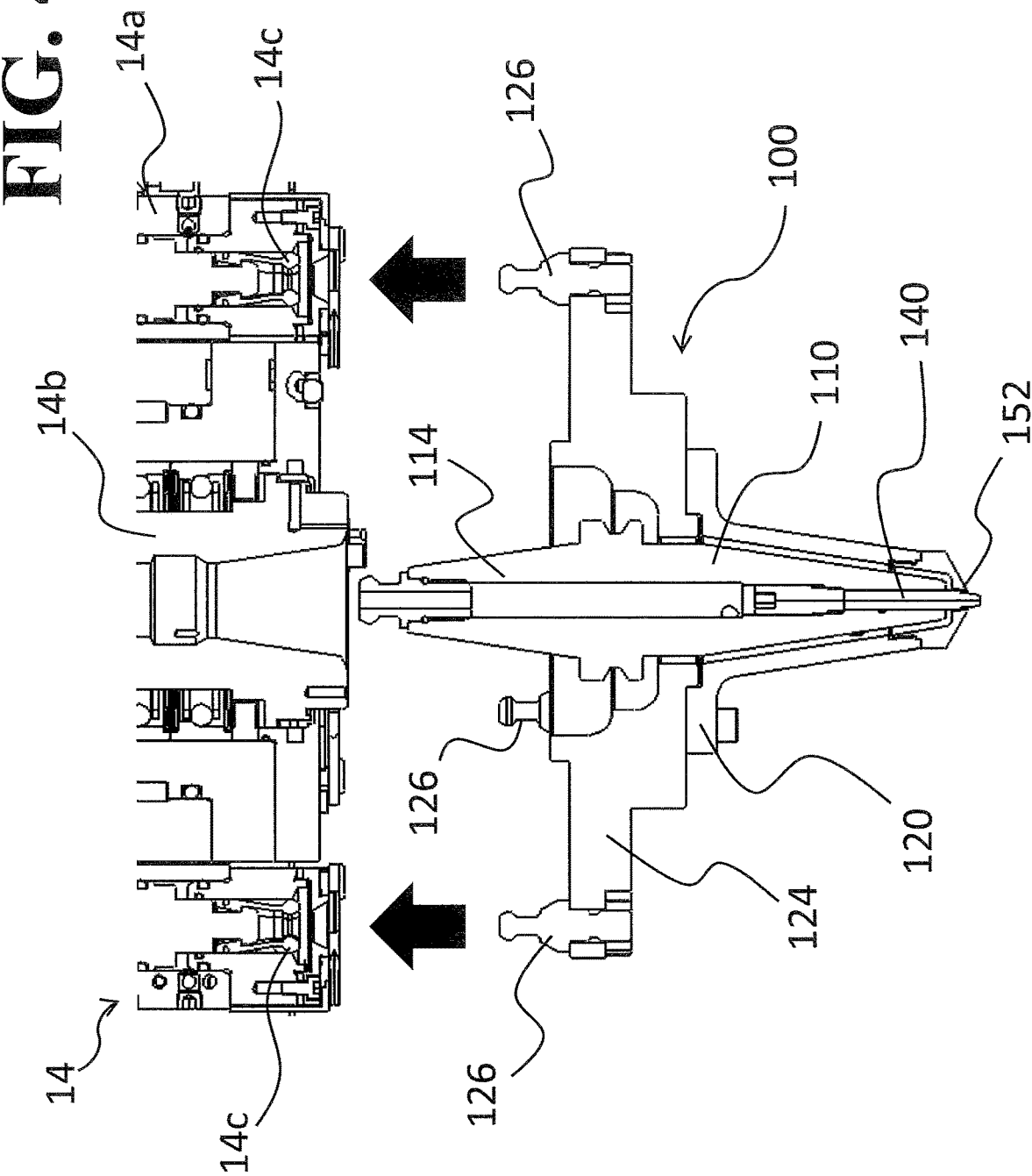

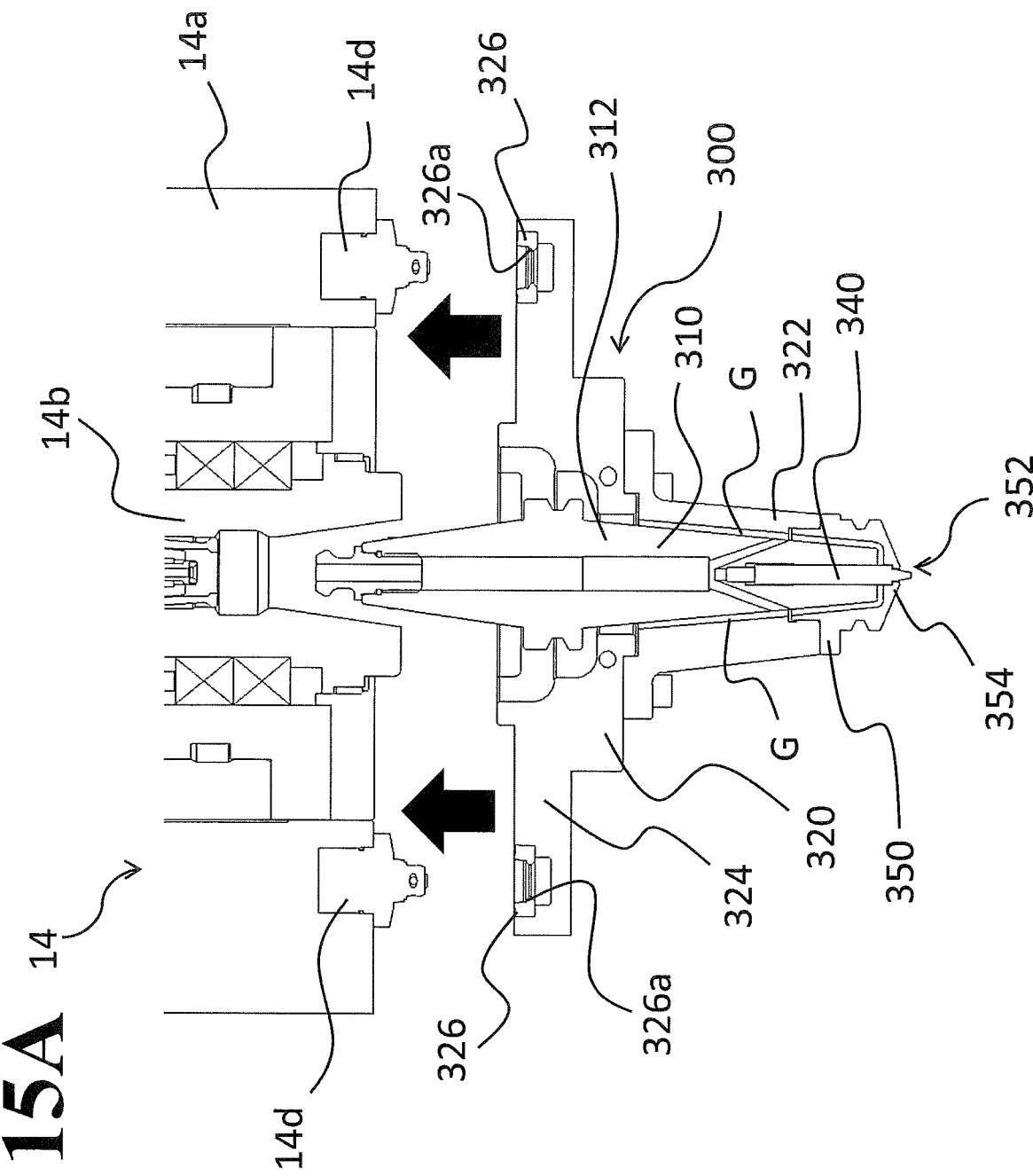

FRICTION STIR WELDING TOOL AND MACHINE TOOL

CROSS-REFERENCE TO RELATED APPLICATIONS

The present application is a continuation application of International Application No. PCT/JP2015/086460, filed Dec. 28, 2015. The contents of this application are incorporated herein by reference in their entirety.

BACKGROUND OF THE INVENTION

Field of the Invention

The present invention relates to a friction stir welding tool and a machine tool.

Discussion of the Background

Conventionally, such a welding device is known that a separate pin and a separate shoulder are mounted on a rotation head and perform friction stir welding with respect to a butting portion defined between workpieces (see Japanese Patent No. 5404389). With this welding device, the shoulder contacting the upper surfaces of the workpieces is kept non-rotatable relative to the workpieces, and the rotating pin is forced into the butting portion defined between workpieces to implement welding. This configuration is advantageous in that the frictional heating necessary for the welding is supplied by the rotation of the pin alone.

Also, such a friction stir welding device is known that is provided with an automatic exchanger that performs an exchange operation of attaching and detaching a rotation tool, which performs friction stir welding, to and from a spindle unit (see Japanese Unexamined Patent Application Publication No. 2009-208116). With this welding device, the exchange work is facilitated with a simpler configuration, resulting in shortened exchange time.

SUMMARY OF THE INVENTION

According to one aspect of the present invention, a friction stir welding tool includes a pin holder, a stir pin, and a housing. The pin holder includes a holder body and a shank. The shank is connected to a rotation spindle. The stir pin is mounted on the holder body. The housing includes a cylindrical portion and a plate portion. Through the cylindrical portion, the pin holder is passed. The plate portion is connected to a spindle frame. The pin holder includes a grip disposed between the holder body and the shank. The grip is to be gripped to attach the pin holder to and detach the pin holder from the rotation spindle. A shoulder is disposed at one end of the cylindrical portion. An engaging portion engageable with the spindle frame is fixed to an upper surface of the plate portion. The pin holder is automatically exchangeable to and from the rotation spindle, and the housing is automatically exchangeable to and from the spindle frame.

According to another aspect of the present invention, a machine tool includes a rotation spindle, a friction stir welding tool, a machining table, a tool storage, and an NC device. In the rotation spindle, a spindle frame is disposed. The friction stir welding tool is mounted on the spindle frame. On the machining table, a workpiece is held. In the tool storage, the friction stir welding tool is temporarily stored. The NC device is configured to control movement of the spindle frame and the machining table. The friction stir welding tool includes a pin holder, a stir pin, and a housing. The pin holder includes a shank connected to the rotation spindle. The stir pin is mounted on the pin holder. The housing includes a cylindrical portion and a plate portion. Through the cylindrical portion, the pin holder is passed. The plate portion is connected to the spindle frame. A shoulder is disposed at one end of the cylindrical portion. An engaging portion engageable with the spindle frame is fixed to an upper surface of the plate portion. The tool storage includes a tool magazine and a housing storage table. A stock of the pin holders is stored in the tool magazine. The housing storage table is separate from the tool magazine and is disposed on the machining table.

According to a further aspect of the present invention, a friction stir welding tool includes a stir pin, a pin holder, and a housing. The stir pin has a rotation axis and includes a tip end and a rear end opposite to the tip end along the rotation axis. The pin holder supports the stir pin to rotate with the stir pin around the rotation axis and has a front portion and a rear portion opposite to the front portion along the rotation axis. The tip end of the stir pin projects from the front portion. The housing houses the pin holder such that the pin holder is rotatable relatively to the housing. The tip end of the stir pin projects from the housing. The housing includes an engaging portion engageable with a spindle frame of a machining head such that the rear portion of the pin holder is attached to a rotation spindle of the machining head to rotate the pin holder. The rotation spindle is rotatable relatively to the spindle frame.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a perspective view of a machine tool that includes a pallet changer using a table clamp device according to the first embodiment, the perspective view illustrating an external appearance of the machine tool with its cover on;

FIG. 4 is a cross-sectional view of the friction stir welding tool and the machining head according to the first embodiment, the cross-sectional view illustrating in detail the structure that the friction stir welding tool is mounted on the machining head;

FIG. 5B is a perspective view of the housing storage table disposed on the machining table of machine tool to which the friction stir welding tool according to the first embodiment is applied, the perspective view schematically illustrating the housing storage table with the housing on;

FIG. 10B is a perspective view of the housing storage table disposed on the machining table of machine tool to which the friction stir welding tool according to the first embodiment is applied, the perspective view schematically illustrating the housing storage table with the housing and the exchange block on;

FIG. 15A is a cross-sectional view of a friction stir welding tool according to the third embodiment, the cross-sectional view illustrating in detail the structure that the friction stir welding tool is mounted on a machining head and illustrating a state before the friction stir welding tool is mounted on the machining head;

DESCRIPTION OF THE EMBODIMENTS

First Embodiment

Figure 1:
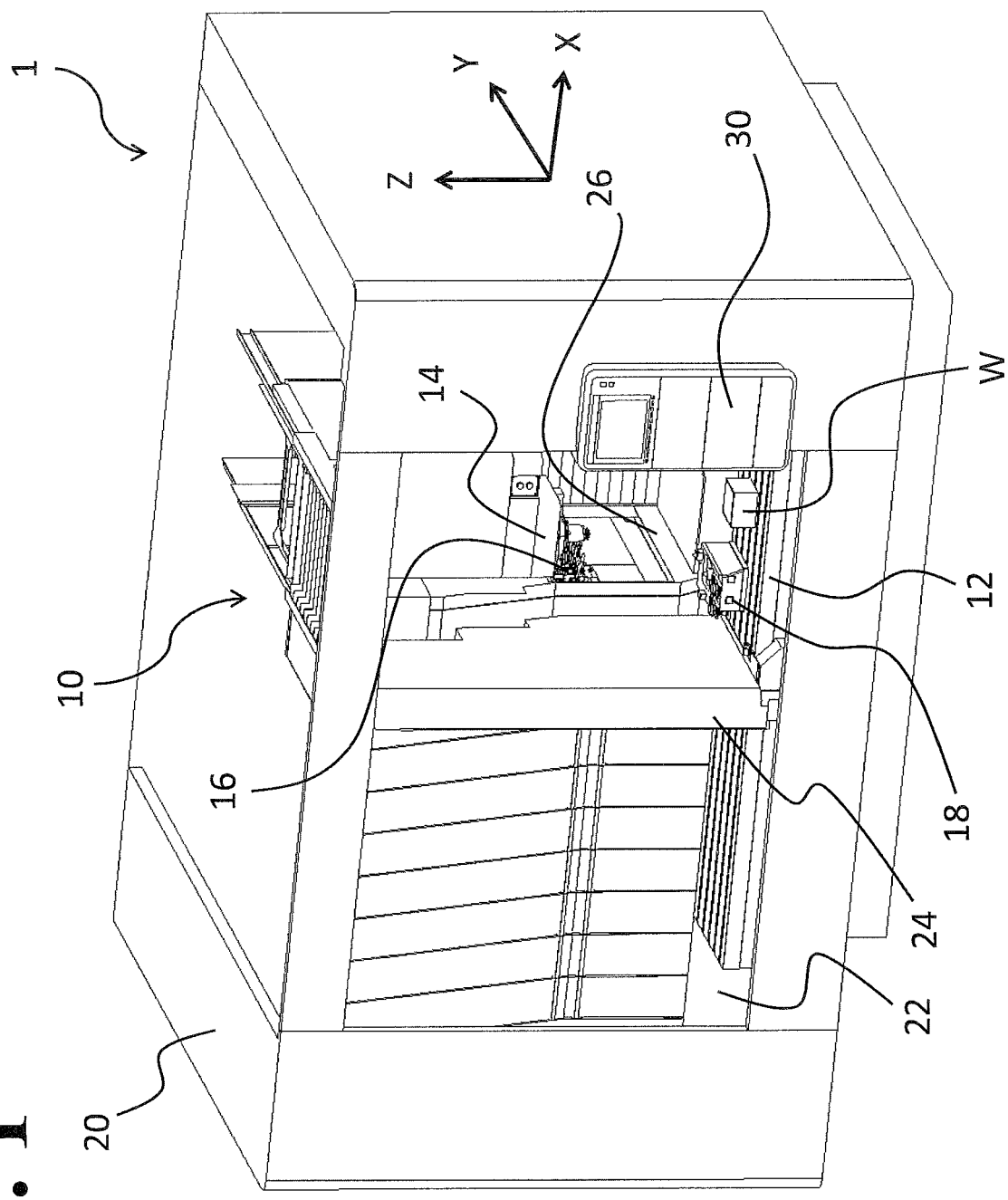

FIG. 1 is a perspective view of a machine tool to which the friction stir welding tool according to the first embodiment is applied, the perspective view schematically illustrating the machine tool. As illustrated in FIG. 1, a machine tool 1, to which the friction stir welding tool according to the first embodiment is applied, includes a body 10, a cover 20, and a human-machine interface 30.

The body 10 of the machine tool 1 includes: a machining table 12, on which a workpiece W is held; a machining head 14, which is movable in XYZ directions relative to the workpieces W; a tool magazine 16, in which stocks of various tool holders such as pin holders and cutting tool holders, described later, are stored; and a housing storage table 18, which is disposed on the machining table 12.

On the upper surface of the machining table 12, a fixing device (not illustrated) and the housing storage table 18 are mounted. The fixing device holds and fixes the workpiece W. On the housing storage table 18, the housing, described later, of the friction stir welding tool is temporarily stored.

The cover 20 surrounds the body 10 of the machine tool 1 to prevent the body 10 from being exposed to the surrounding environment such as air and water.

The cover 20 includes: an opening 22, which provides access to the internal space from the external space; a first partition plate 24, which defines two machining areas in the area in which the machining table 12 of the body 10 exists in the internal space; and a second partition plate 26, which defines a storage area in which the tool magazine 16 is disposed and the machining areas.

The human-machine interface 30 is disposed in the vicinity of the opening 22 of the cover 20.

The human-machine interface 30 includes: an NC device that controls the movement of the machine tool 1 as a whole; an input device on which an operator inputs machining conditions and related information for machining control performed by the NC device; and a display device that shows the operator the machining conditions and results of detection by various sensors.

The NC device includes a main controller and a memory that stores various control programs such as a welding program and a cutting program.

Figure 2:
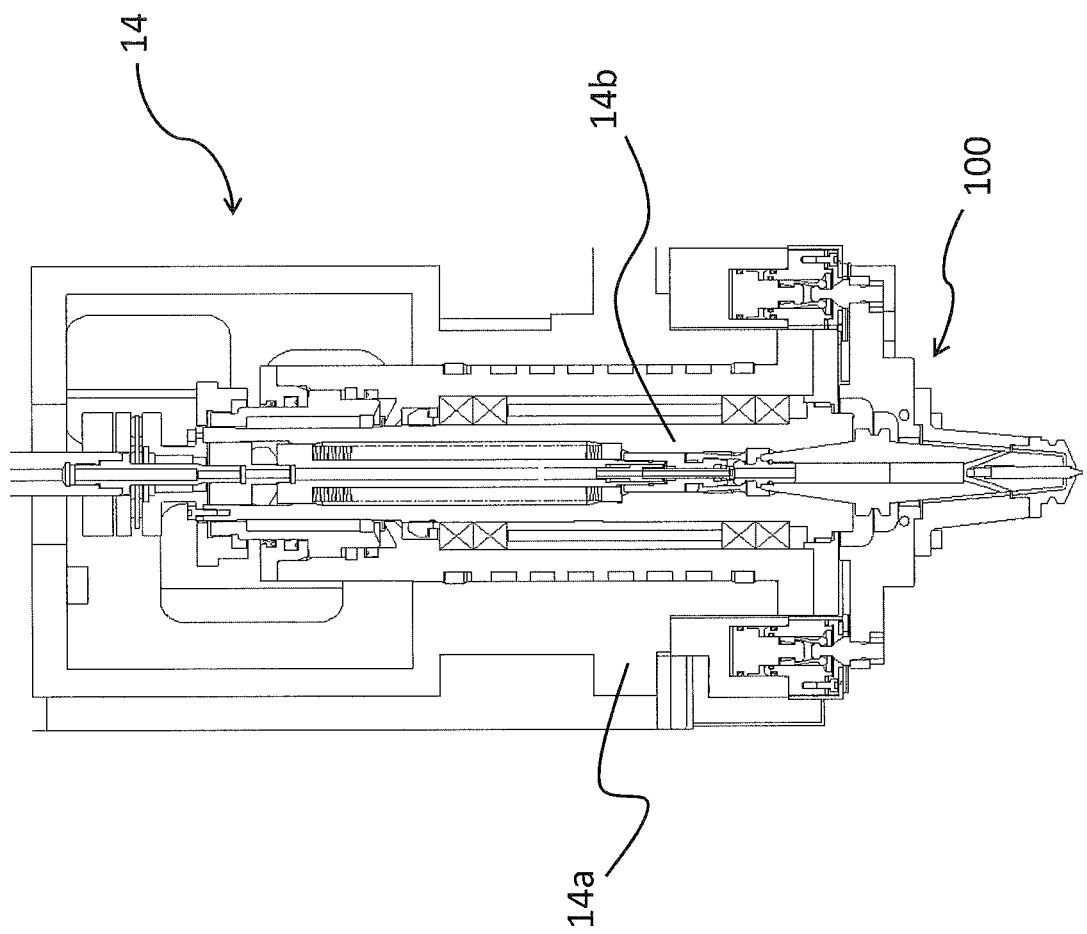
FIG. 2 is a cross-sectional view of a machining head of the machine tool illustrated in FIG. 1, the cross-sectional view schematically illustrating the machining head.

FIG. 2 is a cross-sectional view of a machining head of the machine tool illustrated in FIG. 1, the cross-sectional view schematically illustrating the machining head. As illustrated in FIG. 2, the machining head 14 includes: a hollow spindle frame 14a, which has a form of a case; and a rotation spindle 14b, which is incorporate in the spindle frame.

The spindle frame 14a of the machining head 14 is mounted on an XYZ drive mechanism, not illustrated, to be movable in three, XYZ axes directions.

One end of the rotation spindle 14b is connected to a motor, also not illustrated, to be rotatable.

A friction stir welding tool 100 according to the first embodiment is attachable to and detachable from the lower end of the machining head 14.

Figure 3A:
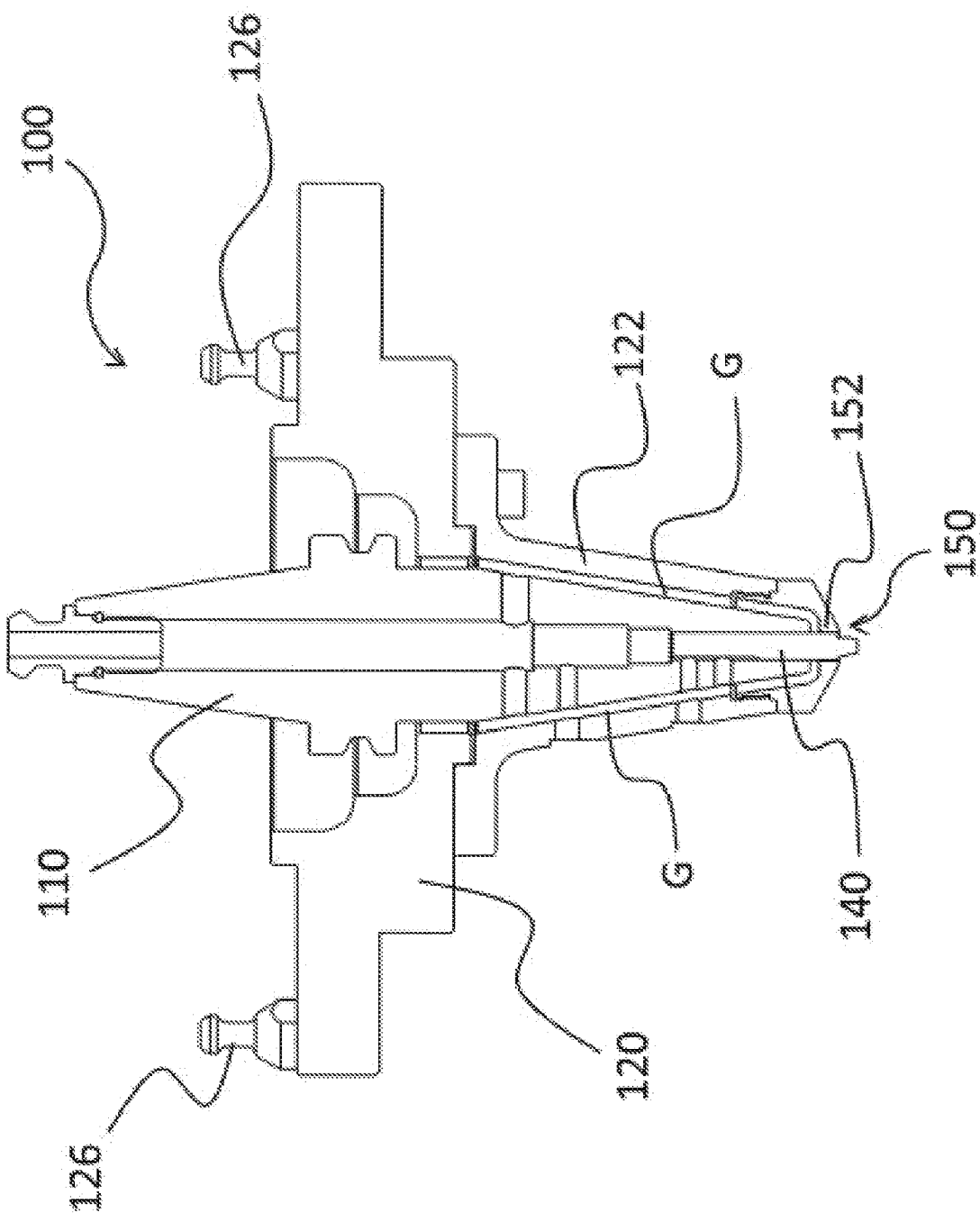
FIG. 3A is a cross-sectional view of the friction stir welding tool according to the first embodiment, the cross-sectional view schematically illustrating the friction stir welding tool according to the first embodiment.
Figure 3C:
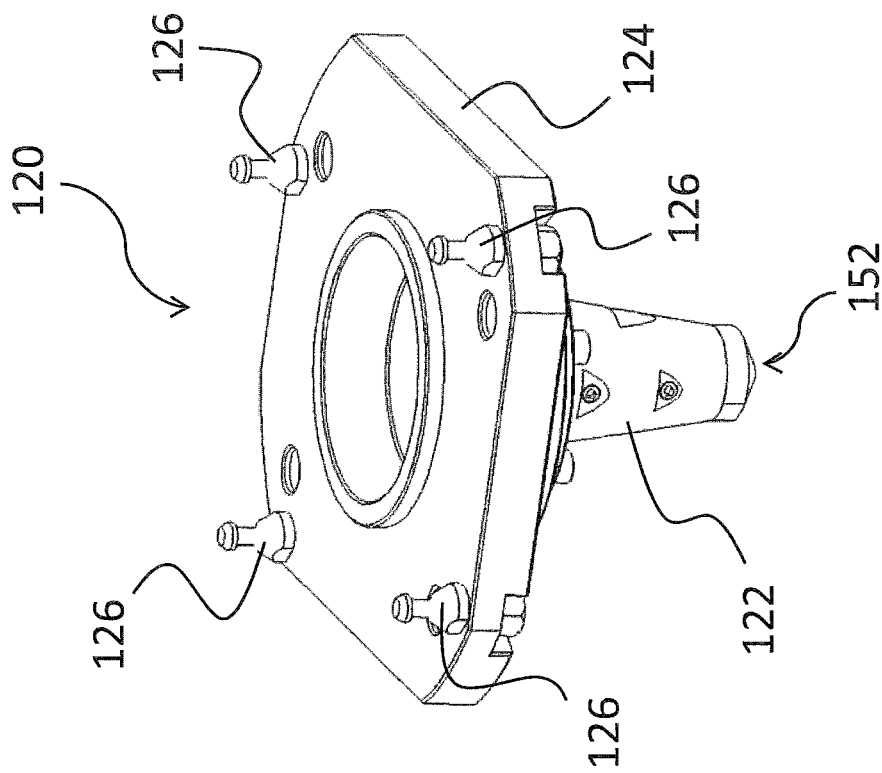
FIG. 3C is a perspective view of a housing illustrated in FIG. 3A, the perspective view schematically illustrating the friction stir welding tool according to the first embodiment.
Figure 3B:
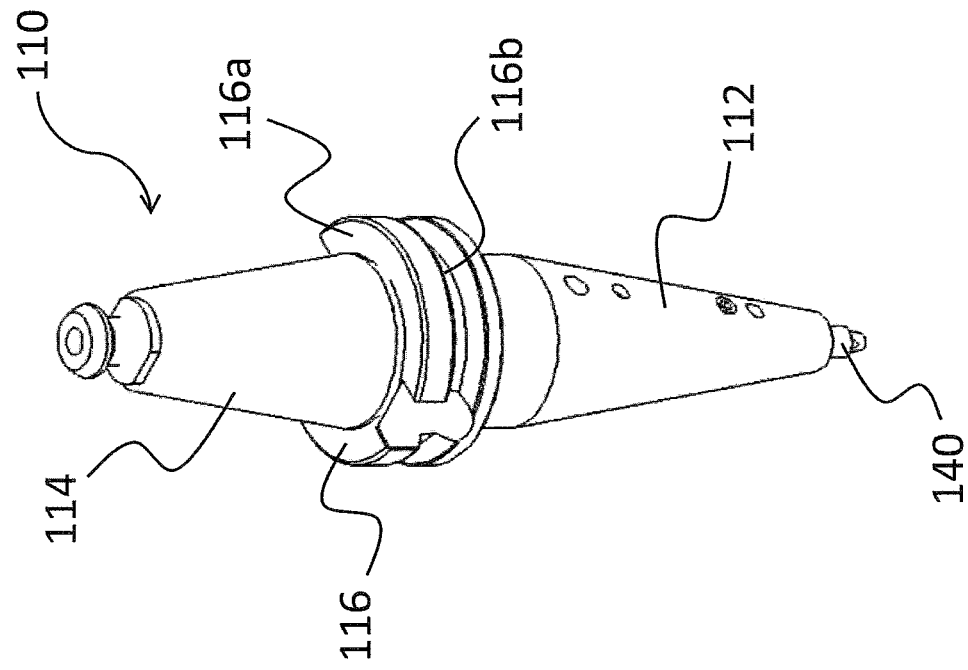
FIG. 3B is a perspective view of a pin holder illustrated in FIG. 3A, the perspective view schematically illustrating the friction stir welding tool according to the first embodiment.

FIG. 3 schematically illustrates the friction stir welding tool according to the first embodiment. FIG. 3A is a cross-sectional view of the friction stir welding tool according to the first embodiment. FIG. 3B is a perspective view of a pin holder illustrated in FIG. 3A. FIG. 3C is a perspective view of a housing illustrated in FIG. 3A.

As illustrated in FIG. 3A, the friction stir welding tool 100 according to the first embodiment includes: a pin holder 110, which is connectable to the rotation spindle 14b of the machining head 14 illustrated in FIG. 2; and a housing 120, in which the pin holder 110 is disposed and which is mountable on the spindle frame 14a of the machining head 14.

As illustrated in FIG. 3B, the pin holder 110 includes: a holder body 112, which is disposed at one end of the pin holder 110 and on which a stir pin 140, described later, is mounted; a shank 114, which is disposed at the other end of the pin holder 110; and a grip 116, which is disposed between the holder body 112 and the shank 114.

At one end, the holder body 112 has an accommodation hole in which the stir pin 140 is accommodated. After the stir pin 140 is inserted into the accommodation hole, the stir pin 140 is fixed to the holder body 112 using bolts or other fixing means.

The grip 116 has such a structure that a flange 116a protrudes outward from the holder body 112 with a holding groove 116b formed in the grip 116. The grip 116 is held by a gripper of the tool magazine, described later.

As illustrated in FIG. 3C, the housing 120 includes: a cylindrical portion (a cylinder) 122, through which the pin holder 110 is passed; a plate portion 124, which is integral to one end of the cylindrical portion 122; and a plurality of pull studs 126, which surround the cylindrical portion 122 on the upper surface of the plate portion 124.

As illustrated in FIG. 3A, at the other end of the cylindrical portion 122, there are formed: a through hole 150, through which the leading end of the stir pin 140, which is mounted on the pin holder 110, is passed; and a shoulder 152, which surrounds the through hole 150.

On the lower surface of the plate portion 124, a plurality of receiving holes (not illustrated) are formed at positions corresponding to protrusions formed on the upper surface of the housing storage table 18, described later.

As illustrated in FIG. 3A, the friction stir welding tool 100 according to the first embodiment is implemented by such a configuration that the stir pin 140, which is mounted on the leading end of the pin holder 110, protrudes through the through hole 150 of the shoulder 152, which is formed at one end of the housing 120.

A gap G is defined between the inner surface of the cylindrical portion 122 of the housing 120 and the outer surface of the holder body 112 of the pin holder 110 when the cylindrical portion 122 and the holder body 112 meet at their normal positions.

This configuration makes the shoulder 152, which is formed on the housing 120, non-rotatable relative to the workpieces W and makes the stir pin 140, which is mounted on the pin holder 110, rotatable relative to the shoulder 152.

FIG. 4 is a cross-sectional view of the friction stir welding tool and the machining head according to the first embodiment, the cross-sectional view illustrating in detail the structure that the friction stir welding tool is mounted on the machining head.

Referring to the friction stir welding tool 100 illustrated in FIG. 4, the plurality of pull studs 126 are mounted on the upper surface of the plate portion 124 of the housing 120.

Referring to the machining head 14, a plurality of collet chucks 14c are formed on the lower surface of the spindle frame 14a at positions corresponding to the plurality of pull studs 126.

The plurality of pull studs 126 are fitted with the plurality of collet chucks 14c, and thus the housing 120 is mounted on and fixed to the spindle frame 14a. The pull studs 126 can be readily released by operating the collet chucks 14c.

Thus, the plurality of pull studs 126, which are formed on the plate portion 124 of the housing 120, constitute engaging portions that are engaged with the collet chucks 14c, which are formed in the spindle frame 14a.

The shank 114 of the pin holder 110 has a taper shape that tapers toward the leading end of the shank 114.

The shank 114 is mounted on the rotation spindle 14b of the machining head 14 by a known method. Thus, the pin holder 110 is connected to the rotation spindle 14b and rotatable together with the rotation spindle 14b.

This arrangement in the friction stir welding tool 100 makes the pin holder 110 and the housing 120 mounted on the machining head 14 separately, that is, the pin holder 110 is mounted on the rotation spindle 14b while the housing 120 is mounted on the spindle frame 14a.

Using such friction stir welding tool 100 according to the first embodiment, the machine tool 1 performs friction stir welding by rotating the stir pin 140, which is mounted on the pin holder 110, while keeping non-rotatable the shoulder 152, which is formed on the housing 120.

In the friction stir welding tool 100 according to the first embodiment, the pin holder 110, on which the stir pin 140 is mounted, and the housing 120, on which the shoulder 152 is formed, are separate from each other so that the pin holder 110 and the housing 120 are individually mounted on the machining head 14, that is, on the rotation spindle 14b and the spindle frame 14a, respectively. This structure is suitable for machine tools provided with automatic tool exchange functions.

By referring to FIGS. 5 to 8, schematic description will be made below with regard to an automatic tool exchange function of the machine tool to which the friction stir welding tool according to the first embodiment is applied.

Figure 5B:
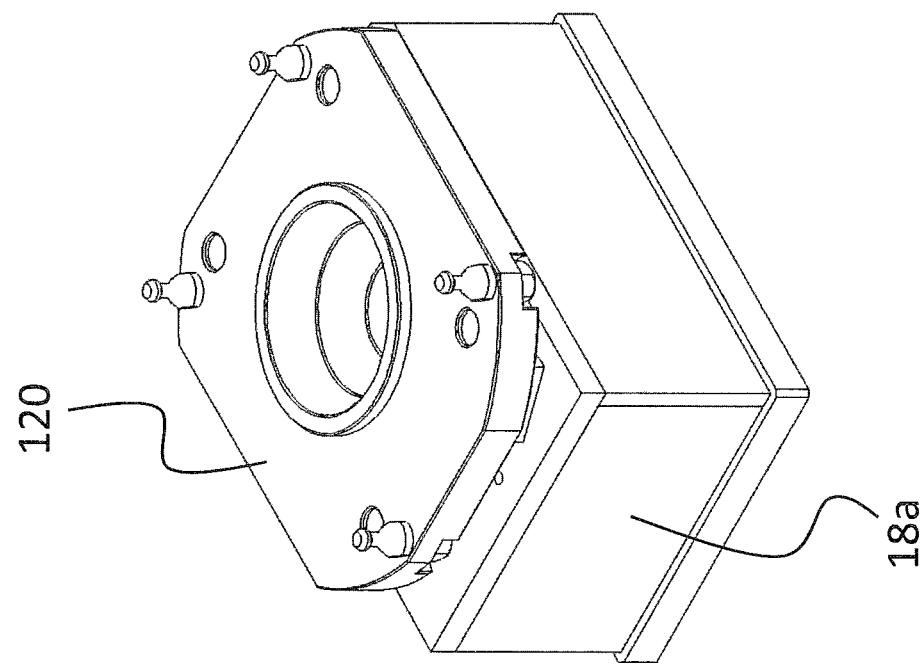
Figure 5A:
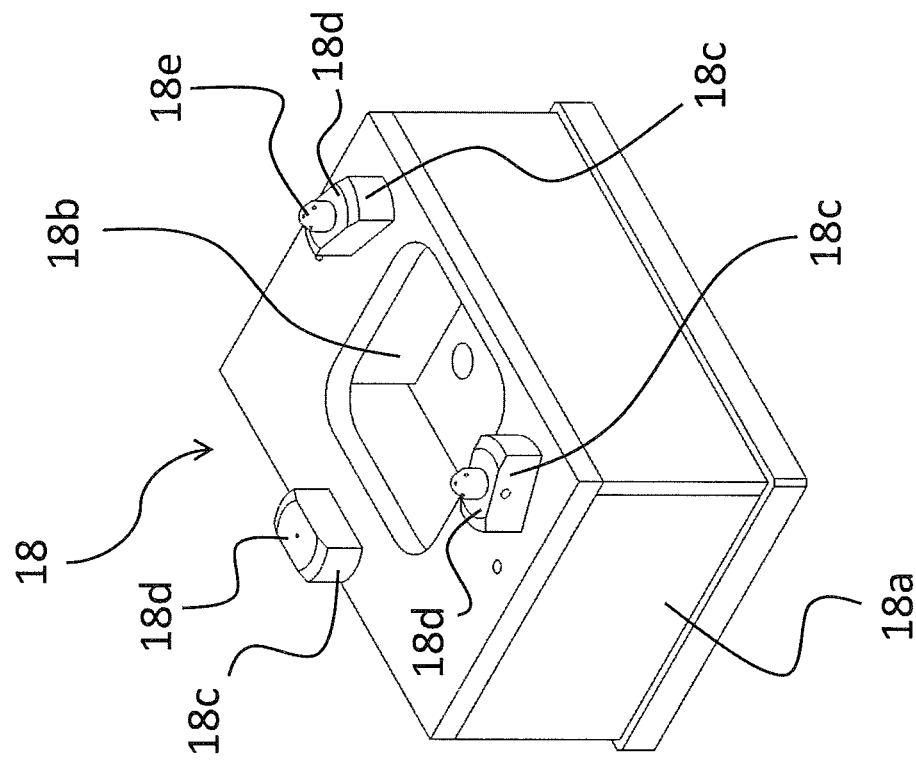
FIG. 5A is a perspective view of a housing storage table disposed on a machining table of a machine tool to which the friction stir welding tool according to the first embodiment is applied, the perspective view schematically illustrating the housing storage table with the housing removed.

FIG. 5 is a perspective view of the housing storage table disposed on the machining table of the machine tool to which the friction stir welding tool according to the first embodiment is applied. FIG. 5A schematically illustrates the housing storage table with the housing removed. FIG. 5B schematically illustrates the housing storage table with the housing on.

As illustrated in FIG. 5A, the housing storage table 18 includes: a pedestal 18a; an accommodation hole 18b, which is formed on the upper surface of the pedestal 18a; and a plurality of protrusions 18c, which surround the accommodation hole 18b.

As illustrated in, for example, FIG. 1, the pedestal 18a is disposed on the machining table 12 within the movable range of the machining head 14.

In this respect, it is possible as necessary to provide a plurality of pedestals 18a or provide a single pedestal 18a with a plurality of accommodation holes 18b and a plurality of protrusions 18c around each accommodation hole 18b. In either case, it is possible to employ a configuration that enables a plurality of housings to be placed or stocked on the housing storage table 18.

The pedestal 18a may be placed anywhere inside the body 10 insofar as the pedestal 18a is within the movable range of the machining head 14.

As illustrated in, for example, FIG. 5A, the plurality of protrusions 18c are disposed at three positions around the accommodation hole 18b. On the upper surfaces, 18d, these three protrusions 18c support the lower surface of the plate portion 124 of the housing 120 removed from the machining head 14, as illustrated in FIG. 5B.

This configuration minimizes the area of contact between the protrusions 18c and the lower surface of the plate portion 124 of the housing 120, reducing damage including damage to the lower surface of the plate portion 124 of the housing 120 at the time of placement.

A protrusion 18e is formed on each of two of the upper surfaces 18d of the protrusions 18c. The protrusion 18e has a hemispheric shape, for example. As described above, receiving holes (not illustrated) are formed on the lower surface of the plate portion 124 of the housing 120 at positions corresponding to the protrusions 18e.

These configurations ensure that the two protrusions 18e are fitted with the receiving holes and thus function as a positioning mechanism (dislocation prevention mechanism) when the housing 120 is placed on the housing storage table 18.

As illustrated in FIG. 5B, the accommodation hole 18b has such a depth that when the housing 120 is placed on the protrusions 18c, no interference occurs between the accommodation hole 18b and the leading end of the stir pin 140 of the pin holder 110 connected to the rotation spindle 14b.

In this respect, it is possible to provide in the accommodation hole 18b a support portion (not illustrated) on which the cylindrical portion 122 of the housing 120 inserted in the accommodation hole 18b is supported from outside the cylindrical portion 122.

FIG. 6 is a perspective view of the machine tool to which the friction stir welding tool according to the first embodiment is applied, the perspective view schematically illustrating housing removal work. FIG. 6A illustrates welding in progress in the housing removal work. FIG. 6B illustrates the movement of the housing toward the housing storage table in the housing removal work. FIG. 6C illustrates the housing placed on the housing storage table in the housing removal work. FIG. 6D illustrates the housing removed in the housing removal work.

Figure 6A:
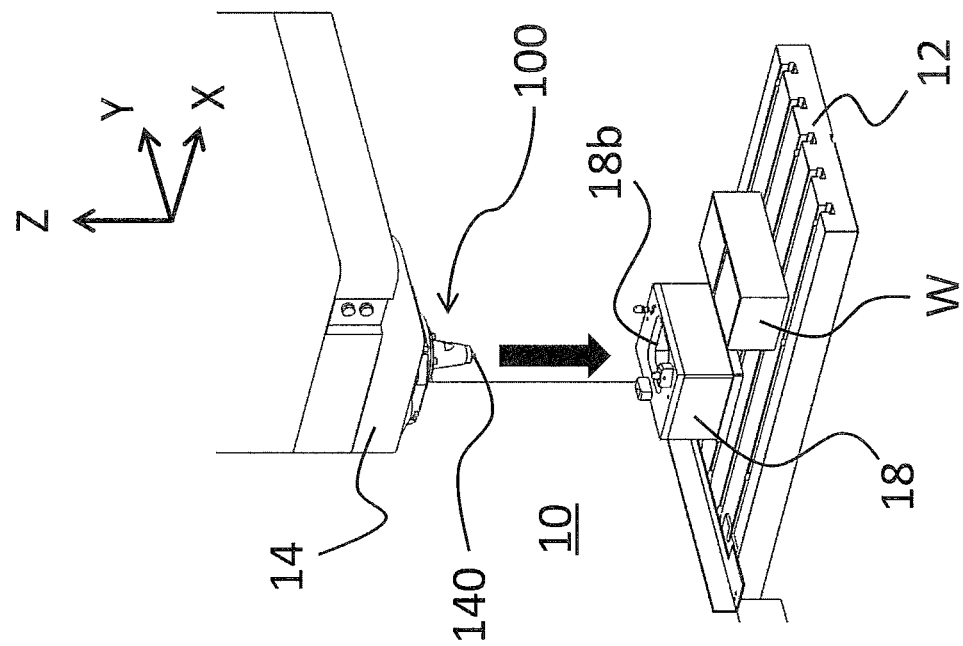
FIG. 6A is a perspective view of the machine tool to which the friction stir welding tool according to the first embodiment is applied, the perspective view schematically illustrating welding in progress in housing removal work.

The machine tool 1 has the friction stir welding tool 100 mounted on the lower end of the machining head 14. As illustrated in FIG. 6A, such machine tool 1 performs friction stir welding with respect to welded portions on the upper surfaces of the workpieces W held on the machining table 12.

Figure 6B:
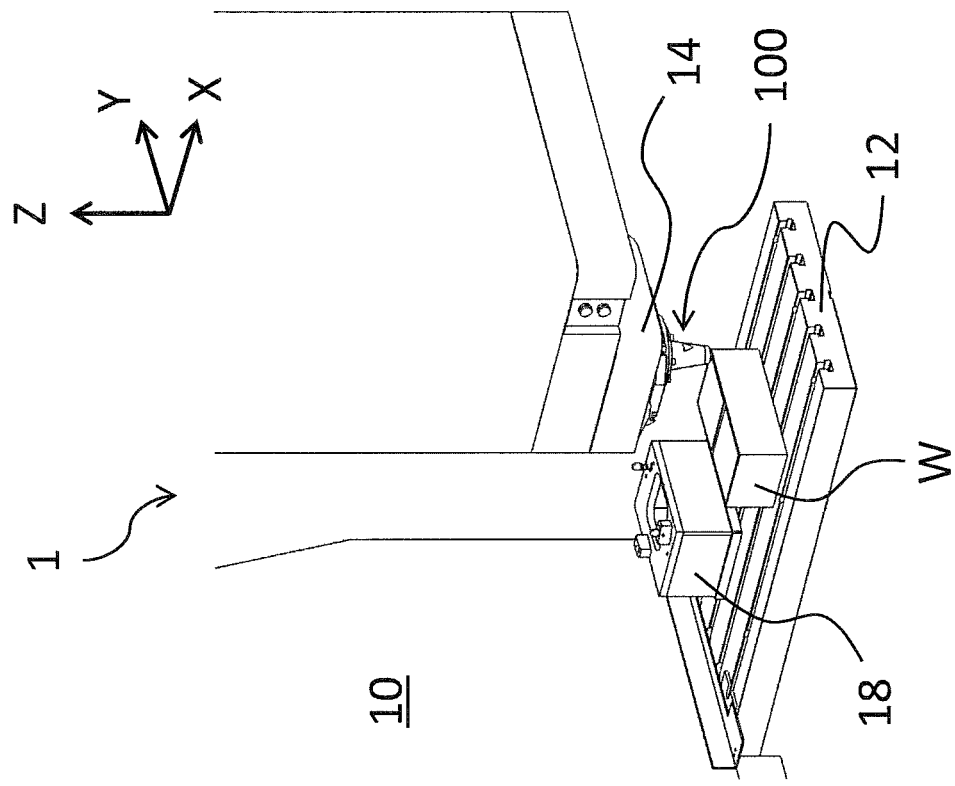
FIG. 6B is a perspective view of the machine tool to which the friction stir welding tool according to the first embodiment is applied, the perspective view schematically illustrating the movement of the housing toward the housing storage table in the housing removal work.

After completion of predetermined welding, a command to exchange the housing 120 or the stir pin 140 of the friction stir welding tool 100 may be sent from, for example, the NC device (not illustrated). In response, as illustrated in FIG. 6B, the machining head 14 is moved in the Z direction to a predetermined avoidance height to be temporarily away from the upper surfaces of the workpieces W. At the avoidance height, the machining head 14 is moved in the XY directions to a position above the housing storage table 18.

Specifically, the stir pin 140 of the friction stir welding tool 100 matches the center axis of the accommodation hole 18b of the housing storage table 18.

Figure 6C:
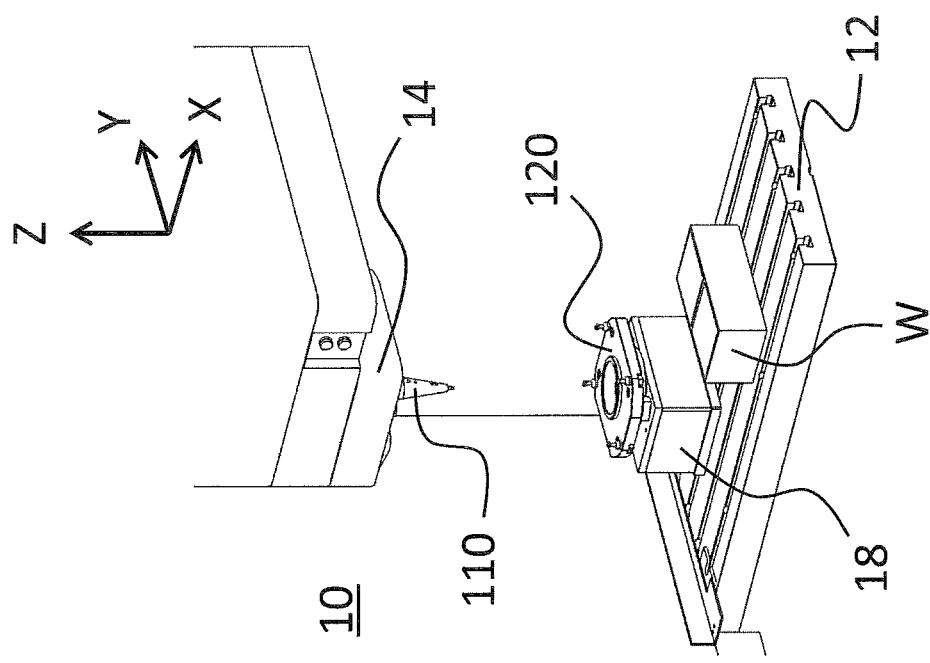
FIG. 6C is a perspective view of the machine tool to which the friction stir welding tool according to the first embodiment is applied, the perspective view schematically illustrating the housing placed on the housing storage table in the housing removal work.

Next, the machining head 14 at the position illustrated in FIG. 6B is moved downward in the Z direction and stopped at the position illustrated in FIG. 6C, where the lower surface of the plate portion 124 of the housing 120 of the friction stir welding tool 100 contacts the upper surfaces 18d of the protrusions 18c of the housing storage table 18.

With the machining head 14 at this position, the connection is released between the plurality of collet chucks 14c, which are formed in the spindle frame 14a of the machining head 14 as illustrated in FIG. 4, and the plurality of pull studs 126, which are formed on the housing 120. Thus, the housing 120 is separated from the spindle frame 14a, that is, from the machining head 14.

Figure 6D:
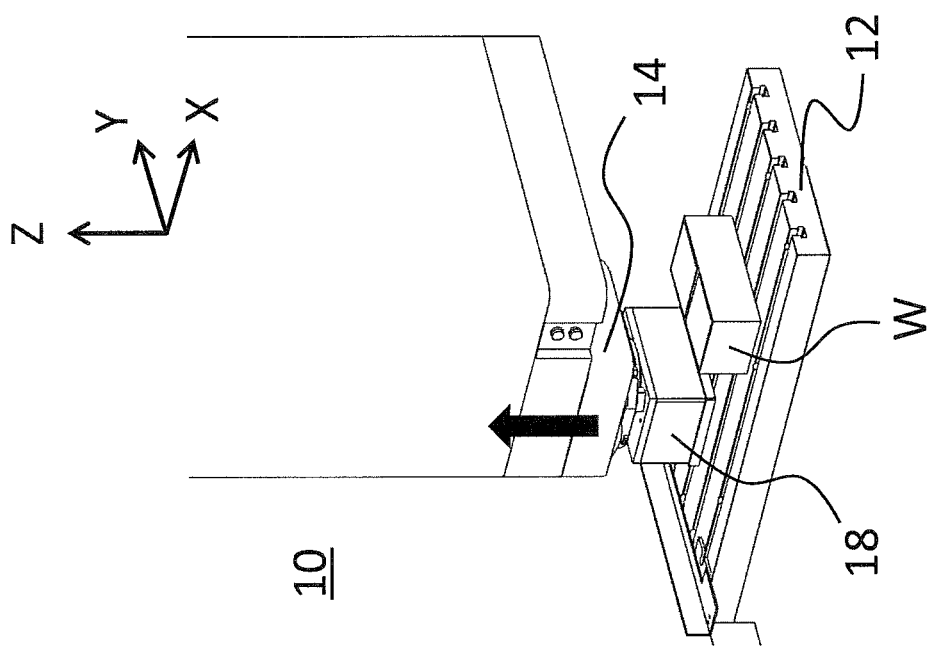
FIG. 6D is a perspective view of the machine tool to which the friction stir welding tool according to the first embodiment is applied, the perspective view schematically illustrating the housing removed in the housing removal work.

Then, the machining head 14 is moved upward in the Z direction from the position illustrated in FIG. 6C. Thus, the work of removing the housing 120 from the machining head 14 is complete, as illustrated in FIG. 6D.

FIG. 7 is a perspective view of the machine tool to which the friction stir welding tool according to the first embodiment is applied, the perspective view schematically illustrating pin-holder exchange work. FIG. 7A illustrates a state immediately after the housing is removed in the pin-holder exchange work. FIG. 7B illustrates the movement of the pin holder toward the tool magazine in the pin-holder exchange work. FIG. 7C illustrates the pin holder transferred to the tool magazine in the pin-holder exchange work. FIG. 7D illustrates the tool magazine preparing another pin holder at the transfer position in the pin-holder exchange work. FIG. 7E illustrates the other pin holder having been received from the tool magazine in the pin-holder exchange work. FIG. 7F illustrates the re-movement of the other pin holder toward the housing storage table in the pin-holder exchange work.

Figure 7A:
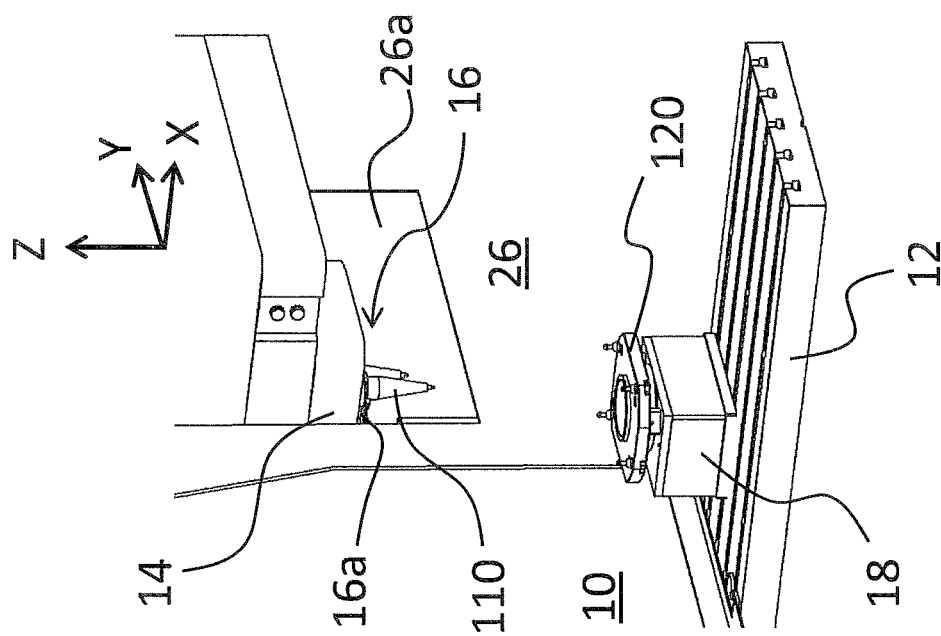
FIG. 7A is a perspective view of the machine tool to which the friction stir welding tool according to the first embodiment is applied, the perspective view schematically illustrating a state immediately after the housing is removed in pin-holder exchange work.

In the work of exchanging the pin holder 110, the housing 120 that has been mounted on the machining head 14 is removed from the machining head 14 and placed on the housing storage table 18, as illustrated in FIG. 7A. It is also possible to start the work based on the positional relationship illustrated in FIG. 6D, instead of based on the positional relationship illustrated in FIG. 7A.

Figure 7B:
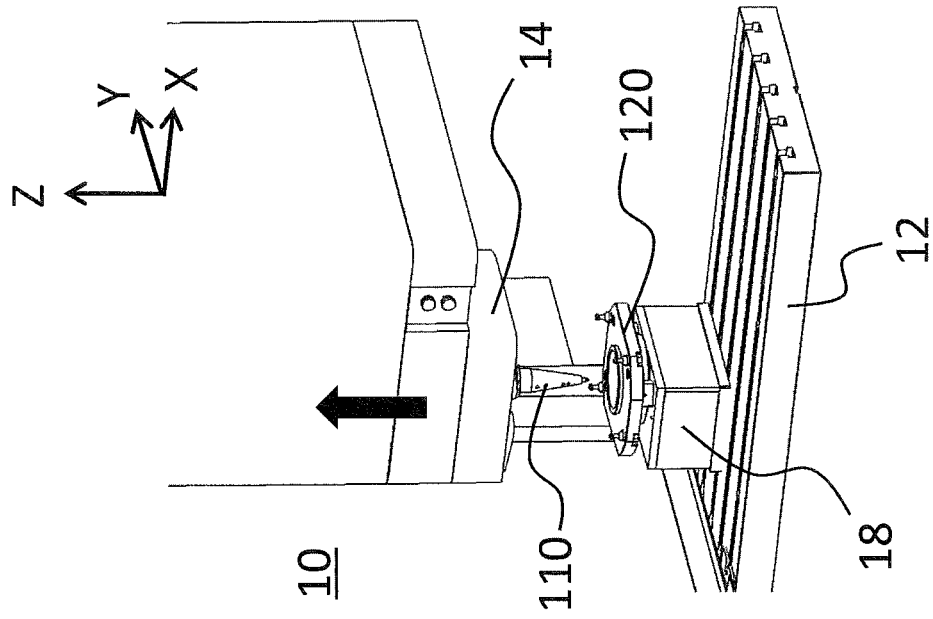
FIG. 7B is a perspective view of the machine tool to which the friction stir welding tool according to the first embodiment is applied, the perspective view schematically illustrating the movement of the pin holder toward a tool magazine in the pin-holder exchange work.

Next, as illustrated in FIG. 7B, in response to the command from the NC device (not illustrated), the machining head 14 is moved toward the tool magazine 16 with the pin holder 110 exposed.

In this respect, the machining head 14 is moved toward and away from the tool magazine 16 through an opening 26a (see FIG. 7B) of the second partition plate 26 illustrated in FIG. 1.

The tool magazine 16 includes: a rotation mechanism (not illustrated) having a rotation axis in the Z direction; a circular plate member (see reference numeral-character 16b in FIG. 14, described later) oriented so that its surface is orthogonal to the rotation axis; and a plurality of grippers 16a, which are mounted on the outer circumference of the circular plate member.

The opening 26a of the second partition plate 26 illustrated in FIG. 7 may have a door that is, for example, slidable to open and close the opening 26a. This configuration prevents contaminants such as dust from passing from the machining area to the storage area.

In the operation illustrated in FIG. 7B, the machining head 14 is moved to a position at which the holding groove 116b (see FIG. 3B) of the grip 116, which is formed on the pin holder 110, is at the same height as the height of one of the plurality of grippers 16a of the tool magazine 16.

Then, with this height maintained, the machining head 14 is moved on an X-Y plane so that the one gripper 16a of the tool magazine 16 holds the holding groove 116b of the pin holder 110.

Then, when the NC device has detected the gripper 16a's holding of the holding groove 116b, the NC device releases the connection between the rotation spindle 14b of the machining head 14 and the shank 114 of the pin holder 110.

Figure 7D:
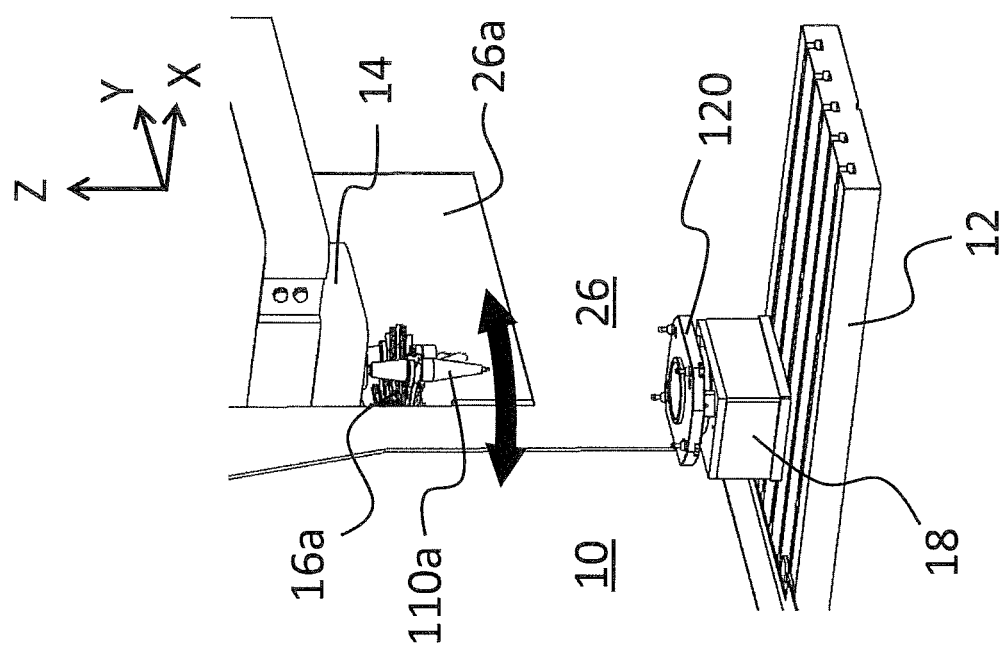
FIG. 7D is a perspective view of the machine tool to which the friction stir welding tool according to the first embodiment is applied, the perspective view schematically illustrating the tool magazine preparing another pin holder at the transfer position in the pin-holder exchange work.
Figure 7C:
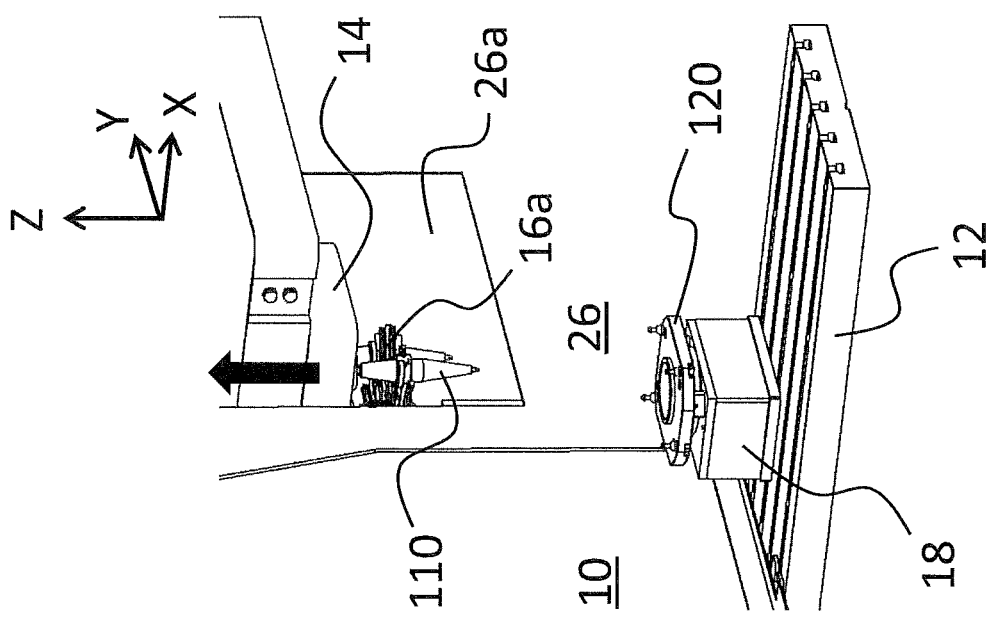
FIG. 7C is a perspective view of the machine tool to which the friction stir welding tool according to the first embodiment is applied, the perspective view schematically illustrating the pin holder transferred to the tool magazine in the pin-holder exchange work.

Next, as illustrated in FIG. 7C, the machining head 14 is moved upward in the Z direction over a distance that is greater than the length of the shank 114 of the pin holder 110.

This causes the shank 114 to be completely removed from the rotation spindle 14b, and thus the transfer of the pin holder 110 to the gripper 16a is complete.

Next, as illustrated in FIG. 7D, the circular plate member of the tool magazine 16 rotates to change the positions of the grippers 16a relative to the machining head 14 so that a new pin holder 110a to be mounted on the machining head 14 is positioned immediately under the rotation spindle 14b of the machining head 14.

Figure 7E:
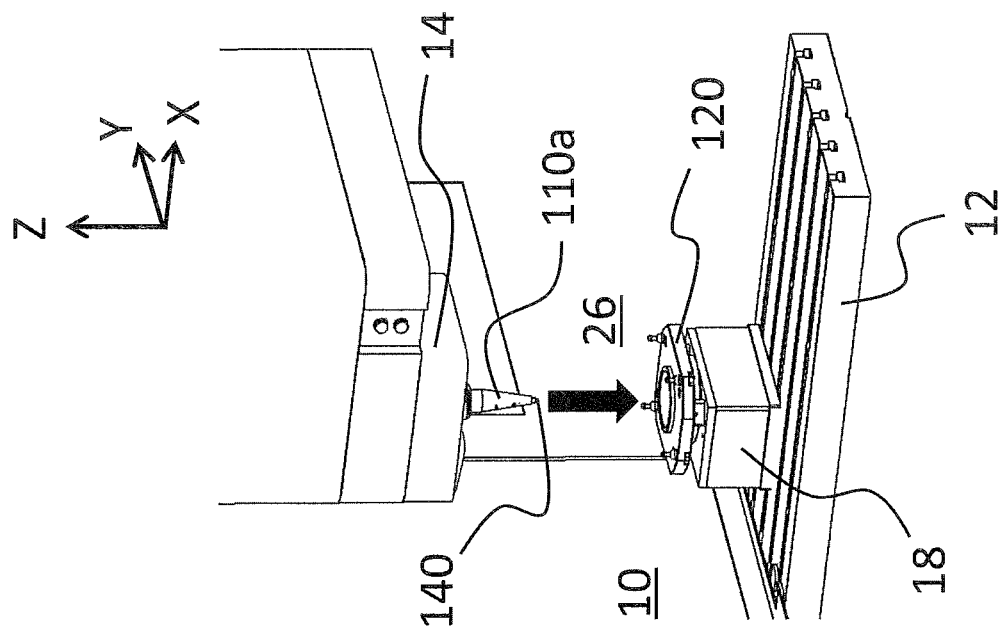
FIG. 7E is a perspective view of the machine tool to which the friction stir welding tool according to the first embodiment is applied, the perspective view schematically illustrating the other pin holder having been received from the tool magazine in the pin-holder exchange work.

Then, as illustrated in FIG. 7E, the machining head 14 is moved in the Z direction to cause the shank of the new pin holder 110a to enter the rotation spindle 14b. Thus, the new pin holder 110a and the rotation spindle 14b are connected to each other.

Then, with this height maintained, the machining head 14 is moved on the X-Y plane to cause the gripper 16a of the tool magazine 16 to release the new pin holder 110a. Thus, the transfer of the new the pin holder 110a is complete.

Figure 7F:
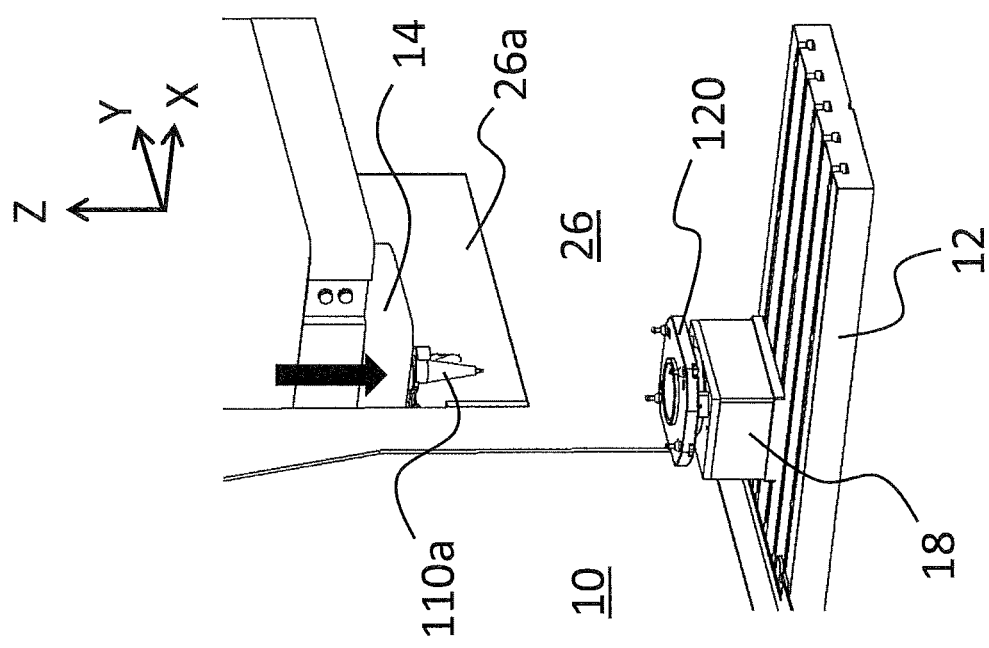
FIG. 7F is a perspective view of the machine tool to which the friction stir welding tool according to the first embodiment is applied, the perspective view schematically illustrating the re-movement of the other pin holder toward the housing storage table in the pin-holder exchange work.

Next, as illustrated in FIG. 7F, the machining head 14 is moved downward to the housing storage table 18. Specifically, the stir pin 140, which is mounted on the pin holder 110a, matches the center axis of the through hole 150 of the housing 120 placed on the housing storage table 18.

After completion of the automatic pin-holder exchange work, the NC device performs the work of mounting the housing 120 onto the spindle frame 14a by performing the procedure illustrated in FIGS. 6B through 6D in backward order. Then, the NC device ends the exchange work of the friction stir welding tool 100.

Figure 8:
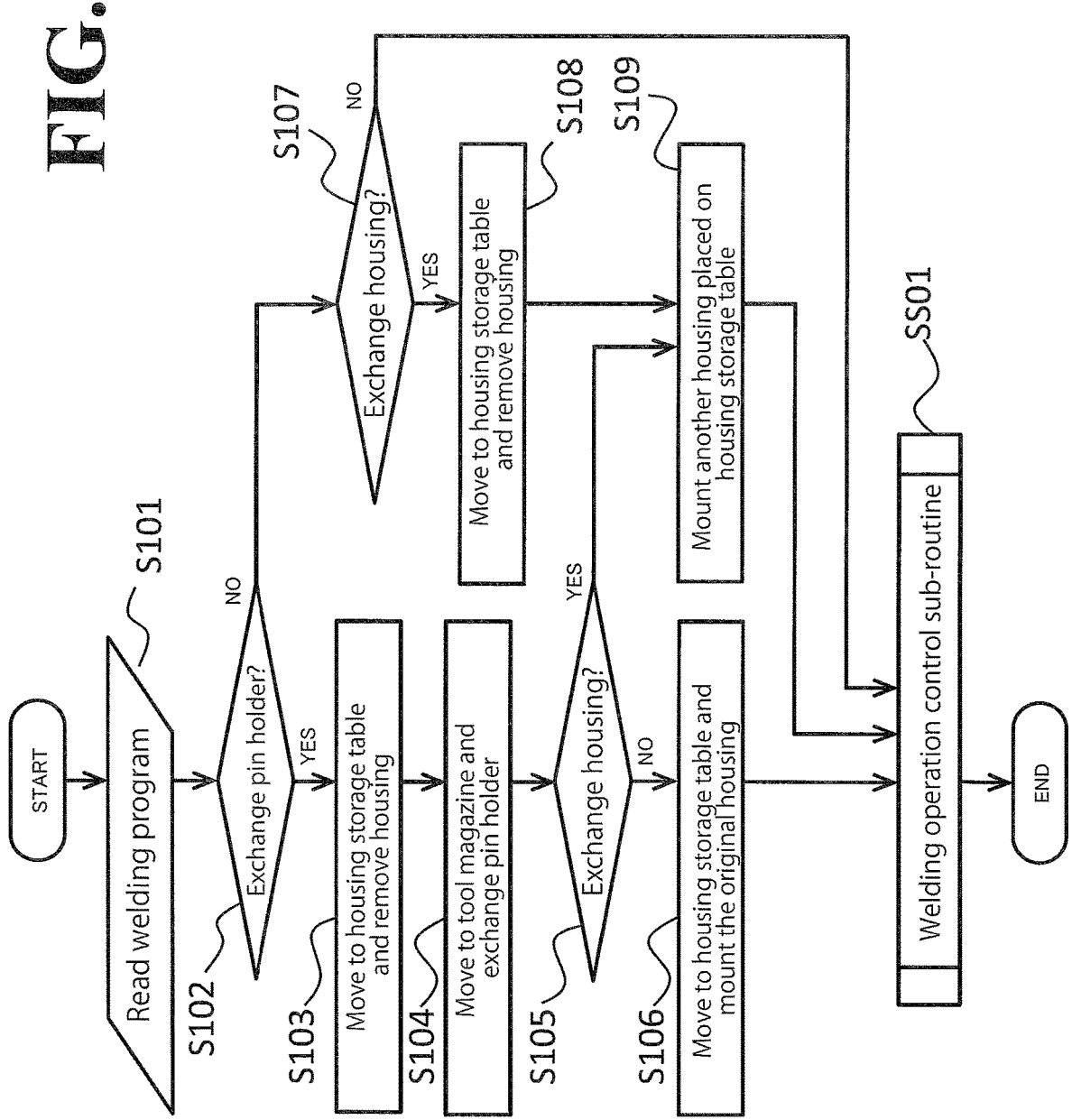
FIG. 8 is a flowchart of an example of welding work including automatic tool exchange in the machine tool to which the friction stir welding tool according to the first embodiment is applied.

FIG. 8 is a flowchart of an example of welding work including automatic tool exchange in the machine tool to which the friction stir welding tool according to the first embodiment is applied.

The flowchart illustrated in FIG. 8 according to the first embodiment is under the assumption that the stir pins and the shoulders are each assigned a unique number or a unique symbol in advance.

As illustrated in FIG. 8, the NC device, which is contained in the human-machine interface 30 of the machine tool 1 illustrated in FIG. 1, first reads from a built-in memory a welding program suitable for the current workpieces W (step S101).

Next, the NC device determines whether the stir pin number or the stir pin symbol of the friction stir welding tool identified in the welding program that has been read matches the stir pin number or the stir pin symbol of the friction stir welding tool that is currently mounted on the machining head (step S102).

At step S102, when the stir pin number or the stir pin symbol of the friction stir welding tool identified in the welding program does not match the stir pin number or the stir pin symbol of the friction stir welding tool that is currently mounted on the machining head, the NC device determines that it is necessary to exchange the current pin holder with another pin holder in which the identified stir pin is mounted, and the procedure proceeds to step S103.

When the current pin holder is to be exchanged, the NC device moves the machining head to a position above the housing storage table and then removes the housing from the spindle frame according to the procedure illustrated in FIG. 6 (step S103).

Then, according to the procedure illustrated in FIG. 7, the NC device exchanges the pin holder, which is now exposed due to the removal of the housing, with another pin holder in which the identified stir pin is mounted (step S104).

Next, the NC device determines whether the shoulder number or the shoulder symbol of the friction stir welding tool identified in the welding program that has been read matches the shoulder number or the shoulder symbol of the friction stir welding tool removed from the machining head at step S103 (step S105).

At step S105, when the shoulder number or the shoulder symbol of the friction stir welding tool identified in the welding program matches the shoulder number or the shoulder symbol of the friction stir welding tool originally mounted on the machining head, the NC device determines that the original friction stir welding tool can be used to perform welding, and the procedure proceeds to step S106.

At step S106, the NC device moves the machining head to a position above the housing storage table and performs in reverse the procedure illustrated in FIG. 6 to cause the housing temporarily removed according to the welding program to be mounted again onto the spindle frame of the machining head.

Then, the NC device determines that the friction stir welding tool identified in the welding program is properly mounted on the machining head, and the procedure proceeds to a welding operation control sub-routine, which is included in the welding program (SS01). In the welding operation control sub-routine, similarly to the first embodiment, the NC device causes friction stir welding to be performed with respect to the workpieces according to welding parameters set in advance. Thus, the execution of the program is complete.

At step S105, when the shoulder number or the shoulder symbol of the friction stir welding tool identified in the welding program does not match the shoulder number or the shoulder symbol of the friction stir welding tool removed from the machining head at step S103, the NC device determines that it is necessary to exchange the current housing with another housing containing a shoulder that is assigned the identified shoulder number or the identified shoulder symbol, and the procedure proceeds to step S109.

In this respect, at step S105, the NC device also determines that it is necessary to exchange the current housing when the combination of the stir pin and the shoulder identified in the welding program is not among the possible combinations in the structure of the friction stir welding tool.

At step S102, when the NC device has determined that the stir pin number or the stir pin symbol of the friction stir welding tool identified in the welding program matches the stir pin number or the stir pin symbol of the friction stir welding tool that is currently mounted on the machining head, the NC device determines whether it is necessary to exchange only the housing currently mounted on the machining head (step S107).

Specifically, the NC device determines whether the shoulder number or the shoulder symbol of the friction stir welding tool identified in the welding program matches the shoulder number or the shoulder symbol of the friction stir welding tool that is currently mounted on the machining head.

In this respect, at step S107 as well, the NC device determines that it is necessary to exchange the current housing when the combination of the stir pin and the shoulder identified in the welding program is not among the possible combinations in the structure of the friction stir welding tool.

At step S107, when the NC device has determined that the shoulder number or the shoulder symbol of the friction stir welding tool identified in the welding program matches the shoulder number or the shoulder symbol of the friction stir welding tool that is currently mounted on the machining head, the NC device determines that the original friction stir welding tool can be used to perform welding, and the procedure proceeds to the welding operation control sub-routine (SS01).

At the welding operation control sub-routine SS01, various welding parameters such as the number of rotations of the tool and the welding speed are used. The welding parameters vary depending on the shape and material of a workpiece and depending on which friction stir welding tool the workpiece is combined with. The NC device performs friction stir welding with respect to the workpieces based on the welding parameters. Thus, the execution of the program is complete.

At step S107, when the NC device has determined that the shoulder number or the shoulder symbol of the friction stir welding tool identified in the welding program does not match the shoulder number or the shoulder symbol of the friction stir welding tool that is currently mounted on the machining head, the NC device moves the machining head to a position above the housing storage table and then removes the housing from the spindle frame according to the procedure illustrated in FIG. 6 (step S108).

Next, at step S109, the NC device performs in reverse the procedure illustrated in FIG. 6 to mount another housing identified in the welding program onto the spindle frame of the machining head. In this respect, the replacing another housing is stored on the housing storage table in advance.

After the another housing is mounted onto the machining head at step S109, the NC device determines that the friction stir welding tool identified in the welding program is properly mounted on the machining head, and the procedure proceeds to the welding operation control sub-routine (SS01).

Then, as described above, at the welding operation control sub-routine SS01, the NC device causes friction stir welding to be performed with respect to the workpieces according to welding parameters set in advance. Thus, the execution of the program is complete.

With the configurations and operations illustrated in FIGS. 1 to 8, the friction stir welding tool according to the first embodiment and the machine tool to which the friction stir welding tool is applied have a one-touch configuration to make a connection and a disconnection between the pin holder and the rotation spindle and between the housing and the spindle frame. The one-touch configuration enables the friction stir welding tool and the machine tool to find applications in automatic tool exchange where separate pins and separate shoulders are used.

Additionally, by applying the one-touch configuration to a machine tool that includes a tool magazine in which a stock of replacement pin holders are stored and a housing storage table on which the housing removed from the spindle frame is placed and held, the machine tool is capable of automatically exchanging the pin holder and the housing only by a movement of the machining head. This configuration, as a result, reduces human labor and step counts.

Second Embodiment

Next, by referring to FIGS. 9 to 14, the friction stir welding tool according to the second embodiment and the machine tool to which the friction stir welding tool is applied will be schematically described. In the second embodiment, the machine tool on which the friction stir welding tool is mounted is similar to that according to the first embodiment illustrated in FIGS. 1 and 2. In the following description, the same elements in these embodiments are assigned the same numerals and/or symbols and will not be elaborated here.

Figure 9A:
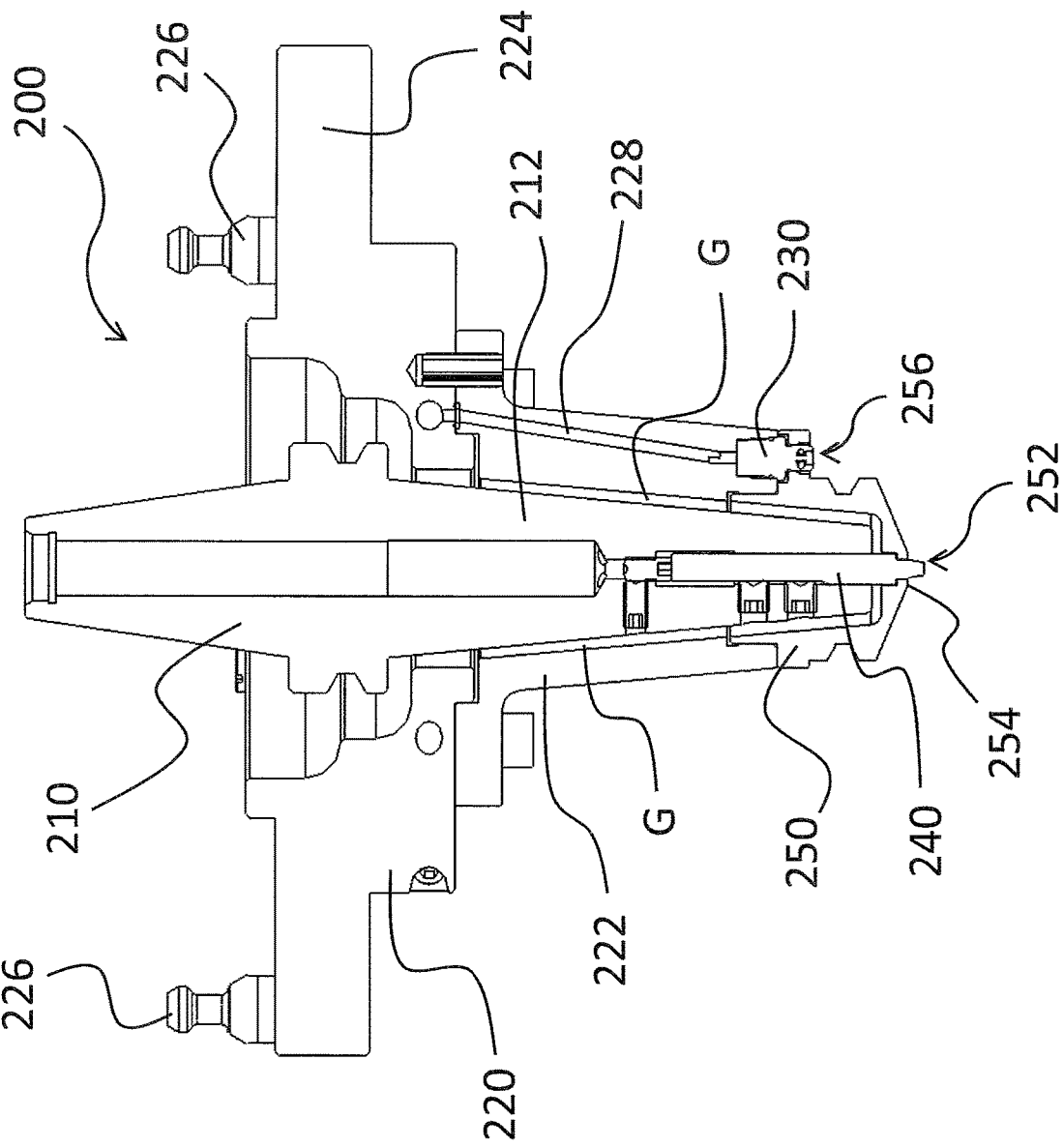
FIG. 9A is a cross-sectional view of the friction stir welding tool according to the second embodiment, the cross-sectional view schematically illustrating the friction stir welding tool according to the second embodiment.
Figure 9C:
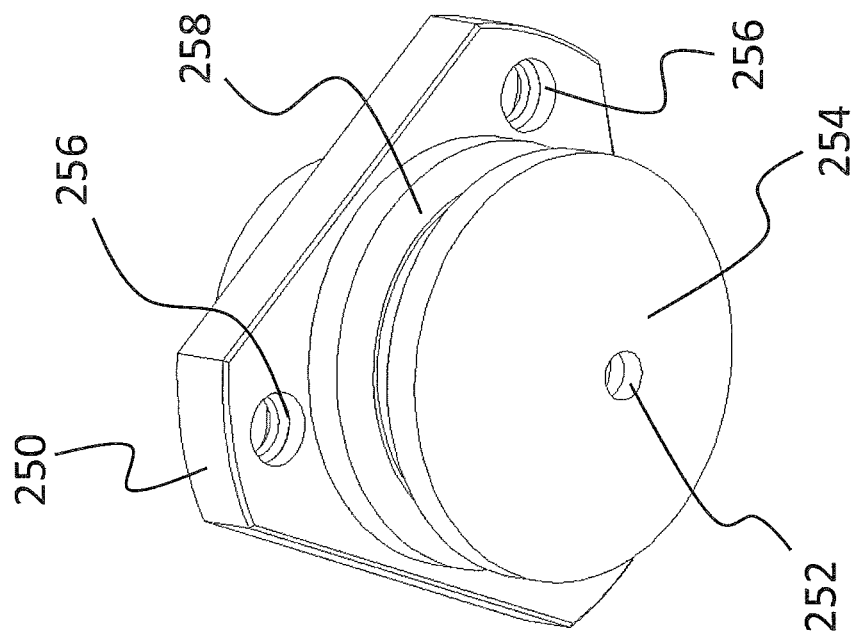
FIG. 9C is a perspective view of an exchange block mounted on a lower end of the housing illustrated in FIG. 9B, the perspective view schematically illustrating the friction stir welding tool according to the second embodiment.
Figure 9B:
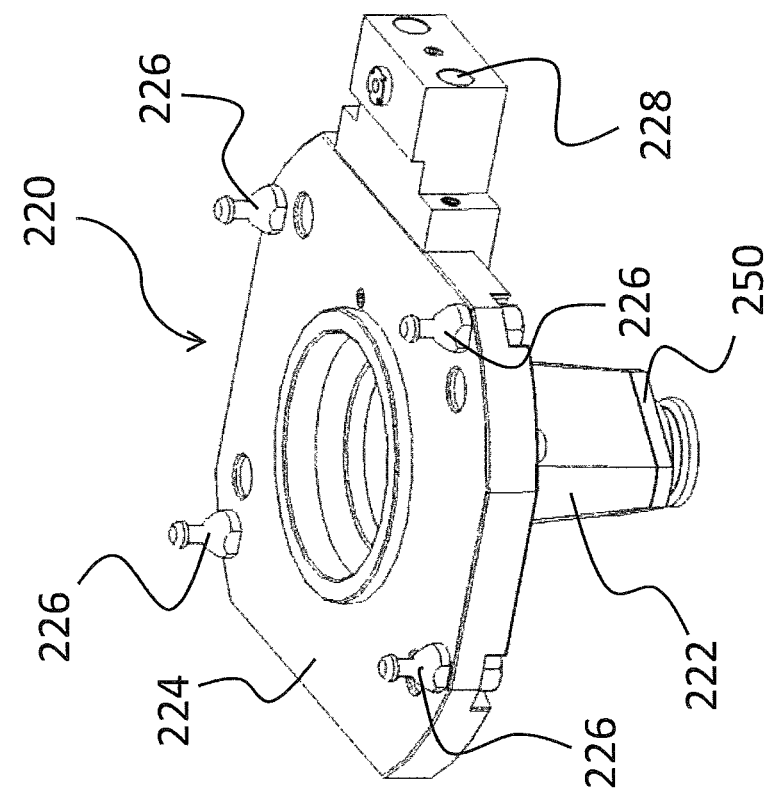
FIG. 9B is a perspective view of a housing illustrated in FIG. 9A, the perspective view schematically illustrating the friction stir welding tool according to the second embodiment.

FIG. 9 schematically illustrates the friction stir welding tool according to the second embodiment. FIG. 9A is a cross-sectional view of the friction stir welding tool according to the second embodiment. FIG. 9B is a perspective view of a housing illustrated in FIG. 9A. FIG. 9C is a perspective view of an exchange block mounted on the lower end of the housing illustrated in FIG. 9B.

As illustrated in FIG. 9A, a friction stir welding tool 200 according to the second embodiment includes: a pin holder 210, which is connectable to the rotation spindle 14b of the machining head 14 illustrated in FIG. 2; and a housing 220, in which the pin holder 210 is disposed and which is mountable on the spindle frame 14a of the machining head 14.

As illustrated in FIG. 9B, the housing 220 includes: a cylindrical portion 222, through which the pin holder 210 is passed; a plate portion 224, which is integral to one end of the cylindrical portion 222; and a plurality of pull studs 226, which surround the cylindrical portion 222 on the upper surface of the plate portion 224.

In the cylindrical portion 222 and the plate portion 224, a conduit 228 is formed, through which pressure of a fluid such as air is supplied to a pull clamp 230, which is of ball lock type, for example. To the other end of the cylindrical portion 222, a bottomed cylindrical exchange block 250 is mounted through the pull clamp 230. The bottomed cylindrical exchange block 250 is attachable to and detachable from the other end of the cylindrical portion 222.

Similarly to the first embodiment, on the lower surface of the plate portion 224, a plurality of receiving holes (not illustrated) are formed at positions corresponding to protrusions formed on the upper surface of the housing storage table 18.

As illustrated in FIG. 9C, the exchange block 250 includes: a through hole 252, which is formed at the center of the bottom of the exchange block 250 and through which the leading end of the stir pin 240 is passed; a shoulder 254, which surrounds the through hole 252; an engagement hole 256, through which the pull clamp 230 is passed; and a holding groove 258, which is to be held by a gripper disposed on the housing storage table or the tool magazine.

The pull clamp 230 includes a plurality of pull clamps 230 on the lower end of the cylindrical portion 222. When the leading end of each pull clamp 230 is engaged with the engagement hole 256, the ball protrudes to implement a clamp structure, while when fluid pressure is applied inside the cylindrical portion 222, the protruding ball is released to implement an unclamp structure.

As illustrated in FIG. 9A, the friction stir welding tool 200 according to the second embodiment is implemented by such a configuration that the stir pin 240, which is mounted on the leading end of the pin holder 210, protrudes through the through hole 252 of the exchange block 250, which is mounted on one end of the housing 220.

Also, similarly to the first embodiment, a gap G is defined between the inner surface of the cylindrical portion 222 of the housing 220 and the outer surface of the holder body 212 of the pin holder 210 when the cylindrical portion 222 and the holder body 212 meet at their normal positions.

This configuration makes the shoulder 254, which is formed on the housing 220, non-rotatable relative to the workpieces W and makes the stir pin 240, which is mounted on the pin holder 210, rotatable relative to the shoulder 254.

Figure 10A:
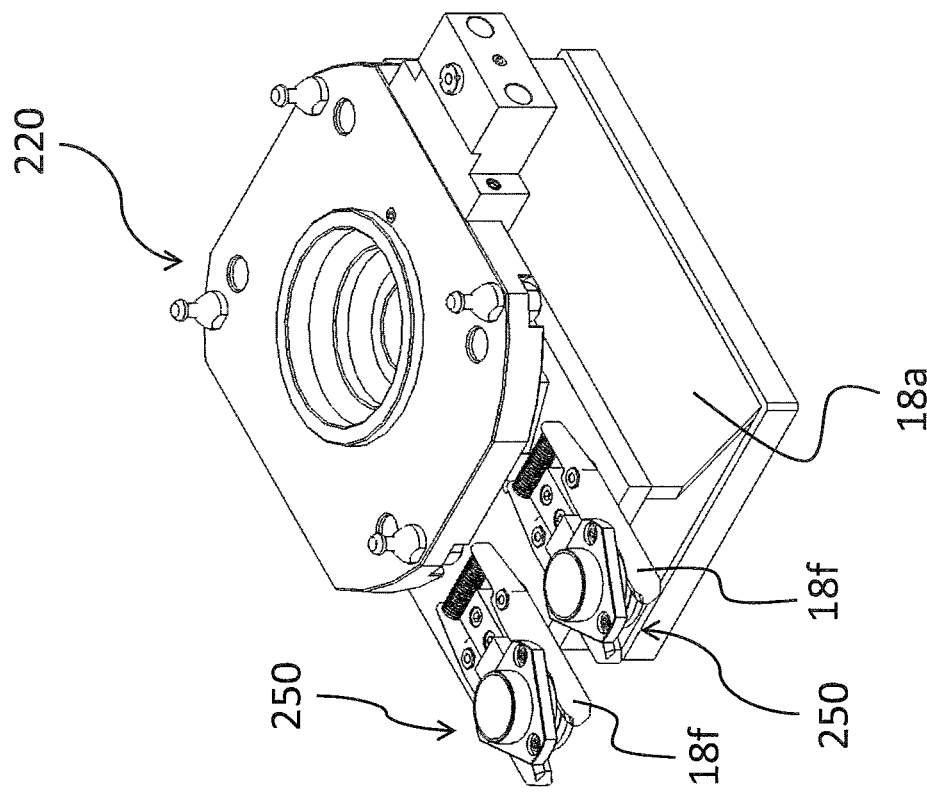
FIG. 10A is a perspective view of a housing storage table disposed on a machining table of a machine tool to which the friction stir welding tool according to the second embodiment is applied, the perspective view schematically illustrating the housing storage table with the housing and the exchange block removed.
Figure 10B:
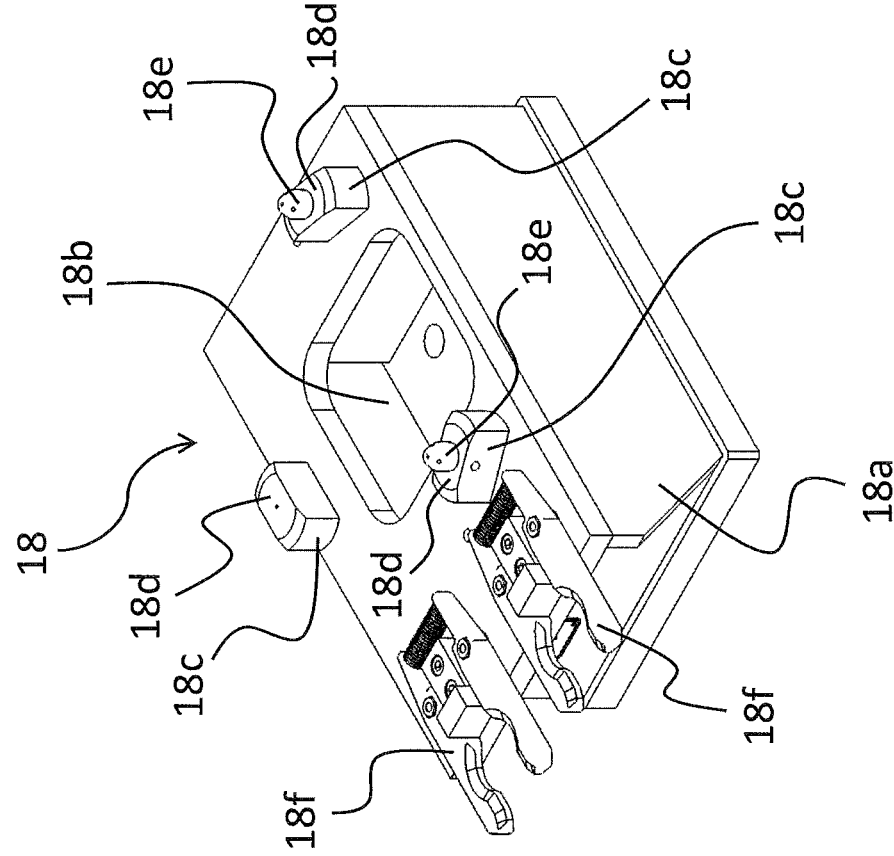

FIG. 10 is a perspective view of a housing storage table disposed on a machining table of the machine tool to which the friction stir welding tool according to the second embodiment is applied, the perspective view schematically illustrating the housing storage table. FIG. 10A illustrates the housing storage table with the housing and the exchange block removed. FIG. 10B illustrates the housing storage table with the housing and the exchange block on.

As illustrated in FIG. 10A, in the second embodiment, the housing storage table 18 includes: a pedestal 18a; an accommodation hole 18b, which is formed on the upper surface of the pedestal 18a; a plurality of protrusions 18c, which surround the accommodation hole 18b; and grippers 18f, which hold the exchange block 250 illustrated in FIG. 9.

Similarly to the first embodiment, the pedestal 18a is disposed on the machining table 12 within the movable range of the machining head 14. As necessary, a plurality of housings may be placed or stocked on the housing storage table 18.

The pedestal 18a may be placed anywhere inside the body 10 insofar as the pedestal 18a is within the movable range of the machining head 14.

As illustrated in, for example, FIG. 10A, the plurality of protrusions 18c are disposed at three positions around the accommodation hole 18b. Similarly to the first embodiment, on the upper surfaces, 18d, these three protrusions 18c support the lower surface of the plate portion 224 of the housing 220 removed from the machining head 14, as illustrated in FIG. 10B.

Also, similarly to the first embodiment, a protrusion 18e is formed on each of two of the upper surfaces 18d of the protrusions 18c. The protrusion 18e has a hemispheric shape, for example. Similarly to the first embodiment, two protrusions 18e are fitted with the receiving holes on the plate portion 224 of the housing 220 and thus function as a positioning mechanism (dislocation prevention mechanism).

As illustrated in FIG. 10B, the accommodation hole 18b has such a depth that when the housing 220 is placed on the protrusions 18c, no interference occurs between the accommodation hole 18b and the leading end of the stir pin 240 of the pin holder 210 connected to the rotation spindle 14b.

In this respect, it is possible to provide in the accommodation hole 18b a support portion (not illustrated) on which the cylindrical portion 222 of the housing 220 inserted in the accommodation hole 18b is supported from outside the cylindrical portion 222.

On the upper surface of the housing storage table 18 according to the second embodiment, the plurality of grippers 18f are formed. The plurality of grippers 18f protrude laterally and in a direction parallel to the upper surface of the housing storage table 18.

Each of the plurality of grippers 18f holds the exchange block 250 when the holding groove 258 of the exchange block 250 enters the gripper 18f from its leading end. As illustrated in FIG. 10B, the plurality of grippers 18f are capable of storing a plurality of exchange blocks 250.

FIG. 11 is a perspective view of the machine tool to which the friction stir welding tool according to the second embodiment is applied, the perspective view schematically illustrating housing removal work. FIG. 11A illustrates welding in progress in the housing removal work. FIG. 11B illustrates the movement of the housing toward the housing storage table in the housing removal work. FIG. 11C illustrates the exchange block removed onto a gripper of the housing storage table in the housing removal work. FIG. 11D illustrates the housing placed on the housing storage table in the housing removal work. FIG. 11E illustrates the housing removed in the housing removal work.

Figure 11A:
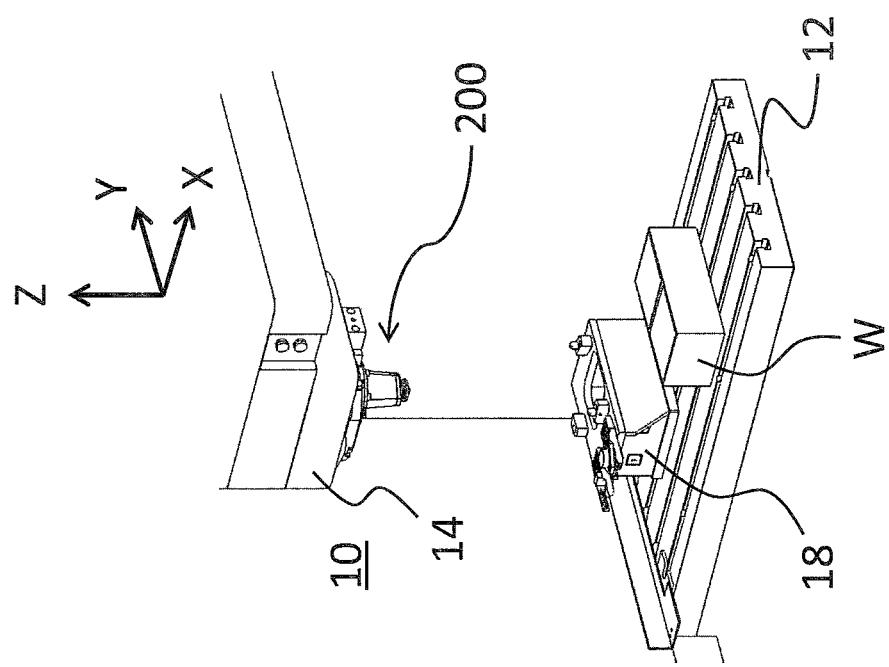
FIG. 11A is a perspective view of the machine tool to which the friction stir welding tool according to the second embodiment is applied, the perspective view schematically illustrating welding in progress in the housing removal work.

The machine tool 1 has the friction stir welding tool 200 mounted on the lower end of the machining head 14. As illustrated in FIG. 11A, such machine tool 1 performs friction stir welding with respect to welded portions on the upper surfaces of the workpieces W held on the machining table 12.

Figure 11B:
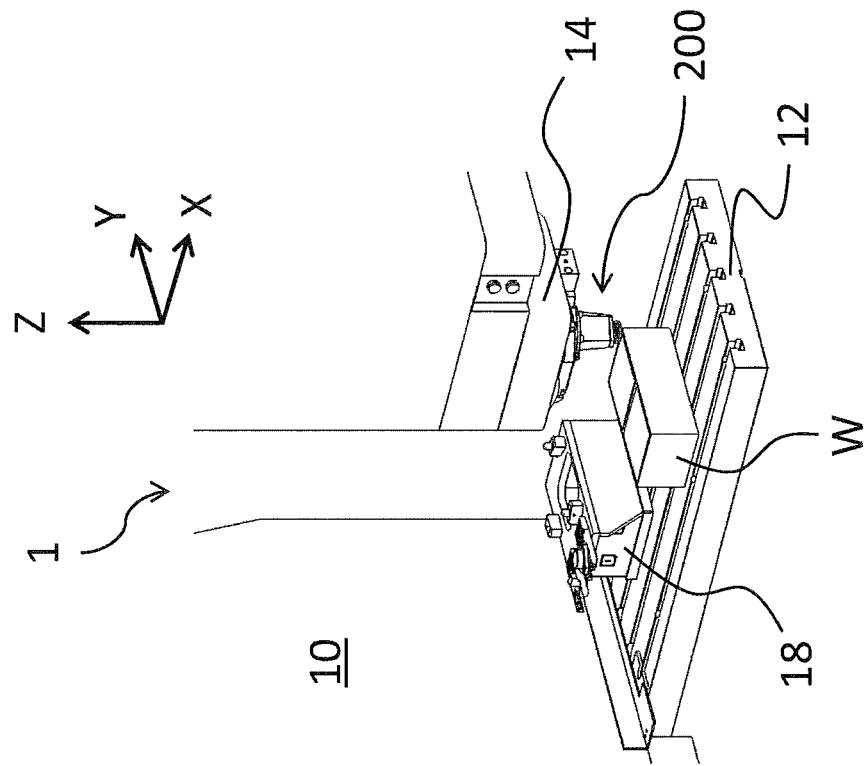
FIG. 11B is a perspective view of the machine tool to which the friction stir welding tool according to the second embodiment is applied, the perspective view schematically illustrating the movement of the housing toward the housing storage table in the housing removal work.

After completion of predetermined welding, a command to exchange the stir pin 240 or the exchange block 250 of the friction stir welding tool 200 may be sent from, for example, the NC device (not illustrated). In response, as illustrated in FIG. 11B, the machining head 14 is moved in the Z direction to a predetermined avoidance height to be temporarily away from the upper surfaces of the workpieces W. At the avoidance height, the machining head 14 is moved in the XY directions to a position above the housing storage table 18.

Figure 11C:
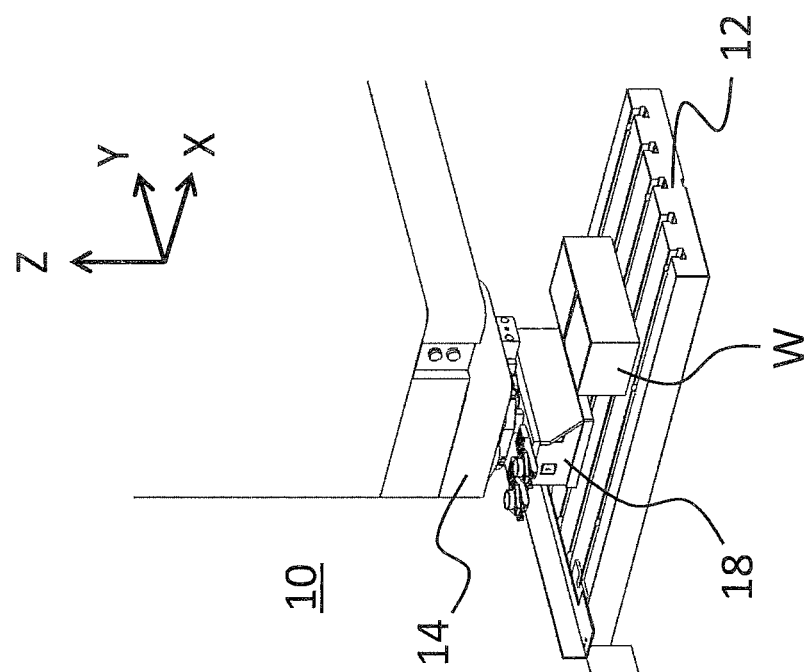
FIG. 11C is a perspective view of the machine tool to which the friction stir welding tool according to the second embodiment is applied, the perspective view illustrating the exchange block removed onto a gripper of the housing storage table in the housing removal work.

Then, as illustrated in FIG. 11C, the machining head 14 is moved down to the height of the grippers 18f of the housing storage table 18. Then, the exchange block 250, which is mounted on the housing 220, is held by a gripper 18f In this manner, the exchange block 250 is removed.

Next, the machining head 14 at the position illustrated in FIG. 11C is moved in the XYZ directions to a position above the accommodation hole 18b of the housing storage table 18 with the stir pin matching the center axis of the accommodation hole 18b.

Figure 11D:
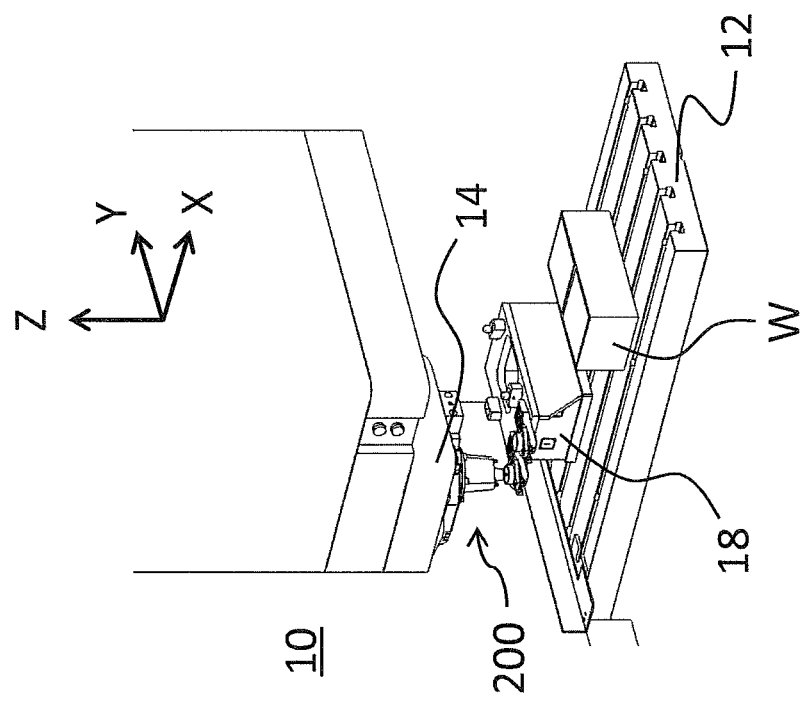
FIG. 11D is a perspective view of the machine tool to which the friction stir welding tool according to the second embodiment is applied, the perspective view schematically illustrating the housing placed on the housing storage table in the housing removal work.

Then, the machining head 14 is moved downward in the Z direction so that the housing 220 is accommodated in the accommodation hole 18b. Then, as illustrated in FIG. 11D, the machining head 14 is stopped at a position at which the lower surface of the plate portion 224 of the housing 220 of the friction stir welding tool 200 contacts the upper surfaces 18d of the protrusions 18c of the housing storage table 18.

At this position, the plurality of collet chucks 14c, which are formed in the spindle frame 14a of the machining head 14 as illustrated in FIG. 4, are disconnected from the plurality of pull studs 226, which are disposed on the housing 220 as illustrated in FIG. 9. In this manner, the housing 220 is separated from the spindle frame 14a, that is, from the machining head 14.

Figure 11E:
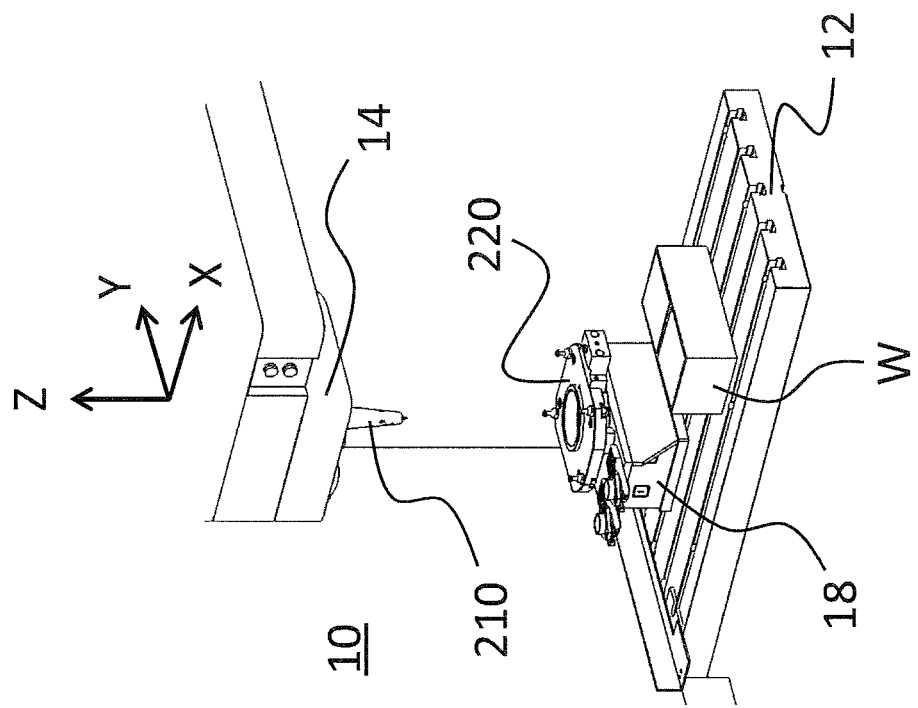
FIG. 11E is a perspective view of the machine tool to which the friction stir welding tool according to the second embodiment is applied, the perspective view schematically illustrating the housing removed in the housing removal work.

Then, as illustrated in FIG. 11E, the machining head 14 is moved upward in the Z direction. Thus, the work of removing the housing 220 is complete.

FIG. 12 is a perspective view of the machine tool to which the friction stir welding tool according to the second embodiment is applied, the perspective view schematically illustrating automatic exchange-block exchange work. FIG. 12A illustrates an operation to cause the gripper to hold the exchange block in automatic exchange-block exchange work. FIG. 12B an operation to remove the exchange block in the automatic exchange-block exchange work. FIG. 12C illustrates an operation to mount another exchange block in the automatic exchange-block exchange work. FIG. 12D illustrates a state after the exchange block is exchanged in the automatic exchange-block exchange work.

In FIG. 12, two grippers 18f are formed on the housing storage table 18, and one of the two grippers 18f stores in advance another exchange block 250a that serves as a replacement.

Figure 12A:
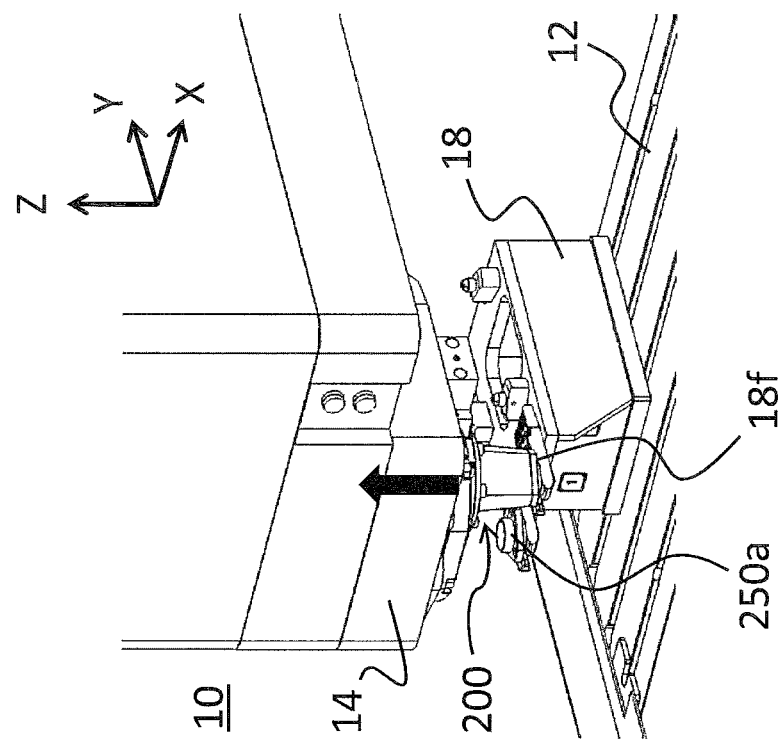
FIG. 12A is a perspective view of the machine tool to which the friction stir welding tool according to the second embodiment is applied, the perspective view schematically illustrating an operation to cause the gripper to hold the exchange block in automatic exchange-block exchange work.

In the exchange of the exchange block 250, which is mounted on the housing 220 of the friction stir welding tool 200 according to the second embodiment, the machining head 14 is moved downward to a position at which the holding groove 258 of the exchange block 250 is at the same height as the grippers 18f of the housing storage table 18, as illustrated in FIG. 12A. Then, the machining head 14 is further moved in the XY directions so that the holding groove 258 of the exchange block 250 is held by the other gripper 18f.

When the NC device has detected that the other gripper 18f has held the holding groove 258, the NC device supplies fluid pressure to the pull clamp 230 illustrated in FIG. 9A to release the connection between the cylindrical portion 222 of the housing 220 and the exchange block 250.

Figure 12B:
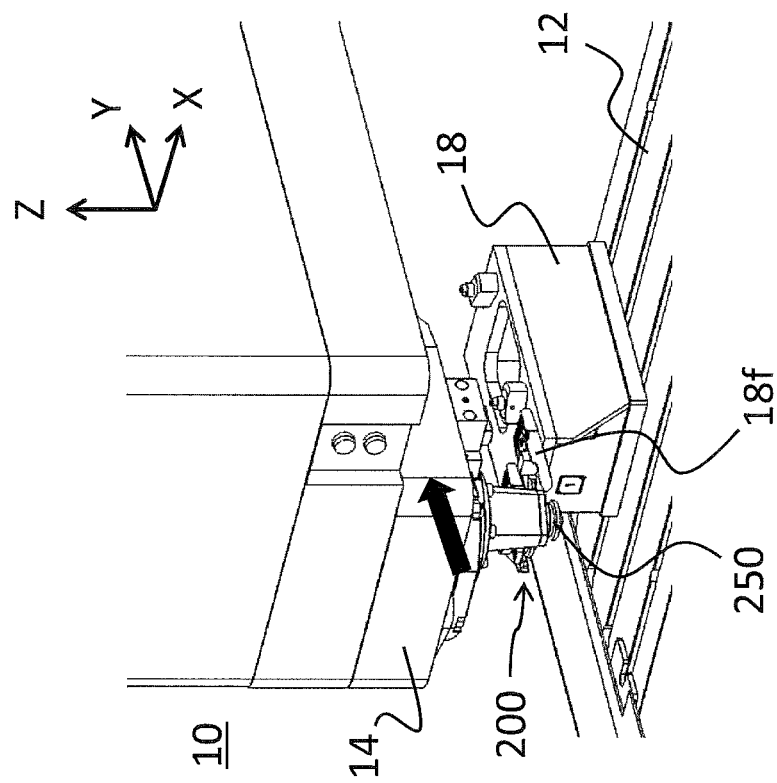
FIG. 12B is a perspective view of the machine tool to which the friction stir welding tool according to the second embodiment is applied, the perspective view schematically illustrating an operation to remove the exchange block in the automatic exchange-block exchange work.

After the connection between the cylindrical portion 222 and the exchange block 250 is released, the NC device moves the machining head 14 upward in the Z direction, as illustrated in FIG. 12B.

Figure 12C:
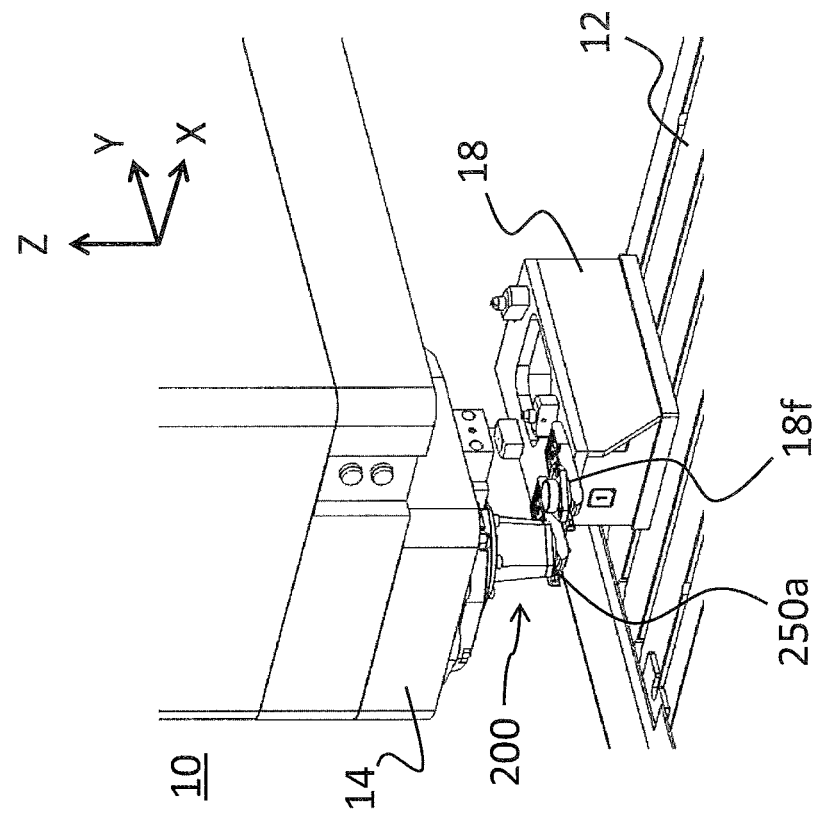
FIG. 12C is a perspective view of the machine tool to which the friction stir welding tool according to the second embodiment is applied, the perspective view schematically illustrating an operation to mount another exchange block in the automatic exchange-block exchange work.

Next, as illustrated in FIG. 12C, with the height of the machining head 14 in the Z direction maintained, the NC device moves the machining head 14 in the XY directions to align the stir pin 240 with the another exchange block 250a stored in advance with the center axis of the stir pin 240 mounted on the machining head 14 matching the center of the through hole 252 of the another exchange block 250a.

Figure 12D:
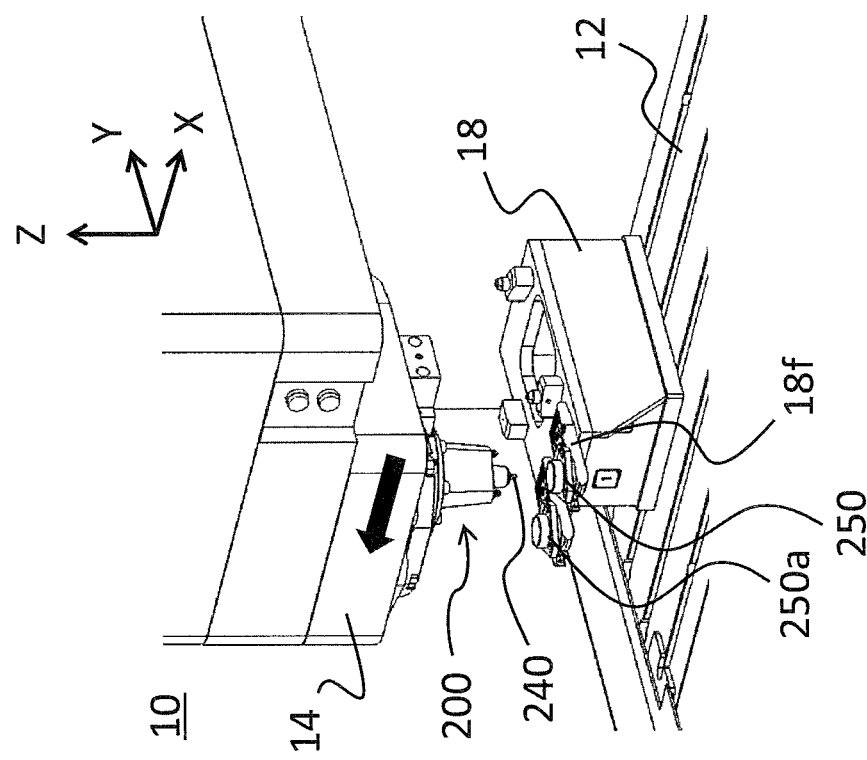
FIG. 12D is a perspective view of the machine tool to which the friction stir welding tool according to the second embodiment is applied, the perspective view schematically illustrating a state after the exchange block is exchanged in the automatic exchange-block exchange work.

Then, as illustrated in FIG. 12D, the NC device moves the machining head 14 downward in the Z direction to bring the lower end of the cylindrical portion 222 of the housing 220 into contact with the upper surface of the another exchange block 250a.

When the NC device has detected the contact between the cylindrical portion 222 and the another exchange block 250a, the NC device releases the fluid pressure applied to the pull clamp 230 to implement a clamp, thereby connecting the cylindrical portion 222 of the housing 220 and the another exchange block 250a to each other.

Then, the NC device moves the machining head 14 in the XY directions to cause the one gripper 18f to release the holding of the holding groove (not illustrated) of the another exchange block 250*a*. Thus, the automatic exchange-block exchange work is complete.

Figure 13:
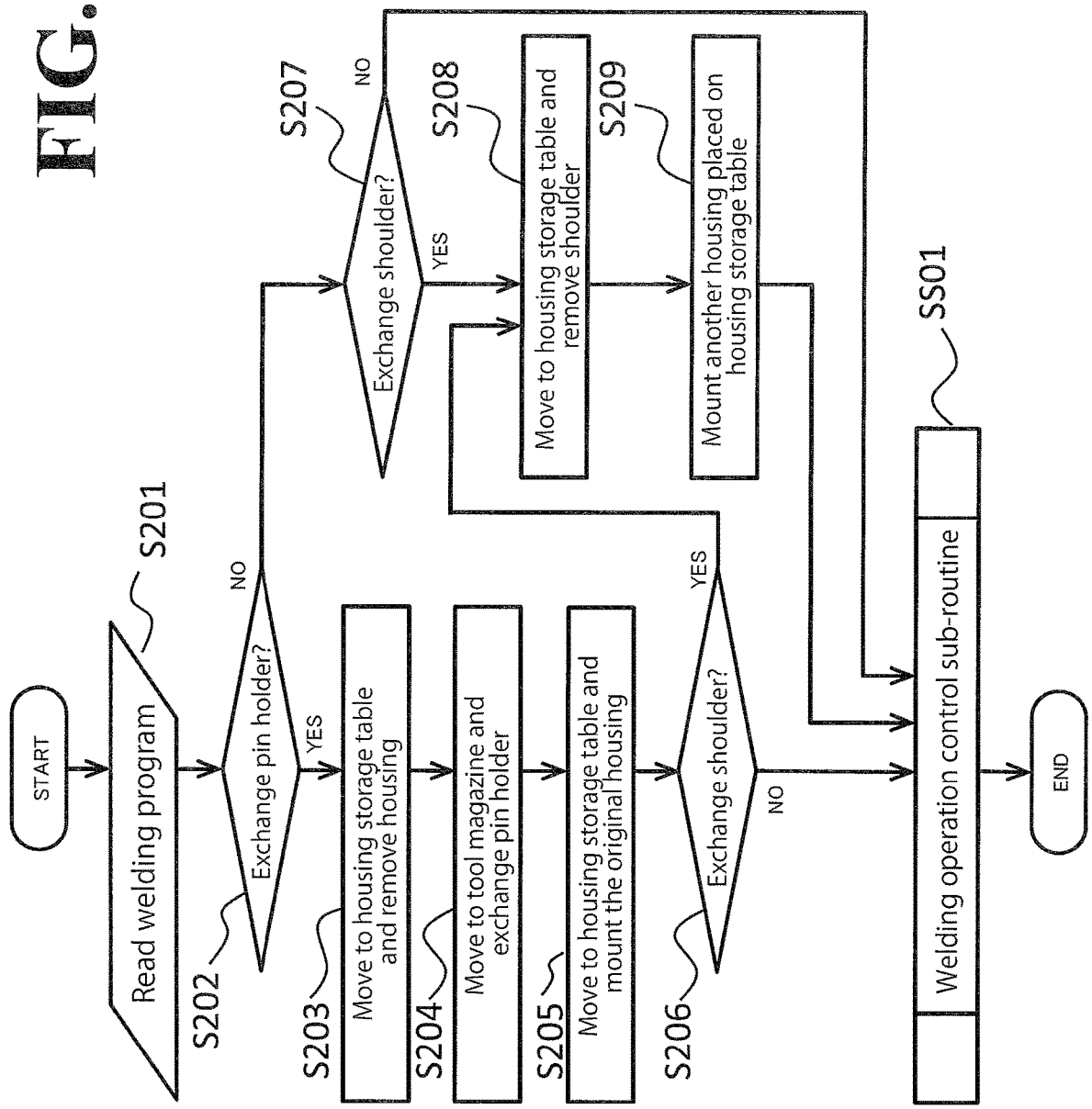
FIG. 13 is a flowchart of an example of welding work including automatic tool exchange in the machine tool to which the friction stir welding tool according to the second embodiment is applied.

FIG. 13 is a flowchart of an example of welding work including automatic tool exchange in the machine tool to which the friction stir welding tool according to the second embodiment is applied.

Similarly to the first embodiment, the flowchart illustrated in FIG. 13 according to the second embodiment is under the assumption that the stir pins and the shoulders are each assigned a unique number or a unique symbol in advance.

As illustrated in FIG. 13, the NC device, which is contained in the human-machine interface 30 of the machine tool 1 illustrated in FIG. 1, first reads from a built-in memory a welding program suitable for the current workpieces W (step S201).

Next, the NC device determines whether the stir pin number or the stir pin symbol of the friction stir welding tool identified in the welding program that has been read matches the stir pin number or the stir pin symbol of the friction stir welding tool that is currently mounted on the machining head (step S202).

At step S202, when the stir pin number or the stir pin symbol of the friction stir welding tool identified in the welding program does not match the stir pin number or the stir pin symbol of the friction stir welding tool that is currently mounted on the machining head, the NC device determines that it is necessary to exchange the current pin holder with another pin holder in which the identified stir pin is mounted, and the procedure proceeds to step S203.

When the current pin holder is to be exchanged, similarly to the first embodiment, the NC device moves the machining head to a position above the housing storage table and then removes the housing from the spindle frame according to the procedure illustrated in FIG. 6 (step S203).

Then, according to the procedure illustrated in FIG. 7, the NC device exchanges the pin holder, which is now exposed due to the removal of the housing, with another pin holder in which the identified stir pin is mounted (step S204). Then, the NC device moves the machining head to a position above the housing storage table and performs in reverse the procedure illustrated in FIG. 6 to cause the housing temporarily removed according to the welding program to be mounted again onto the spindle frame of the machining head (step S205).

Next, the NC device determines whether the shoulder number or the shoulder symbol of the friction stir welding tool identified in the welding program that has been read matches the shoulder number or the shoulder symbol of the friction stir welding tool originally mounted on the machining head (step S206).

At step S206, when the shoulder number or the shoulder symbol of the friction stir welding tool identified in the welding program matches the shoulder number or the shoulder symbol of the friction stir welding tool originally mounted on the machining head, the NC device determines that the original friction stir welding tool can be used to perform welding, and the procedure proceeds to the welding operation control sub-routine, which is included in the welding program (SS01).

At the welding operation control sub-routine (SS01), similarly to the first embodiment, the NC device causes friction stir welding to be performed with respect to the workpieces according to welding parameters set in advance. Thus, the execution of the program is complete.

At step S206, when the shoulder number or the shoulder symbol of the friction stir welding tool identified in the welding program does not match the shoulder number or the shoulder symbol of the friction stir welding tool originally mounted on the machining head, the NC device determines that it is necessary to exchange the current exchange block with the identified exchange block, and the procedure proceeds to step S208.

In this respect, similarly to the first embodiment, at step S206, the NC device also determines that it is necessary to exchange the exchange block when the combination of the stir pin and the shoulder identified in the welding program is not among the possible combinations in the structure of the friction stir welding tool.

Also at step S202, when the NC device has determined that the stir pin number or the stir pin symbol of the friction stir welding tool identified in the welding program matches the stir pin number or the stir pin symbol of the friction stir welding tool that is currently mounted on the machining head, the NC device determines whether it is necessary to exchange only the shoulder that is currently mounted on the machining head (step S207).

Specifically, the NC device determines whether the shoulder number or the shoulder symbol of the friction stir welding tool identified in the welding program matches the shoulder number or the shoulder symbol of the friction stir welding tool that is currently mounted on the machining head.

In this respect, at step S207 as well, when the combination of the stir pin and the shoulder identified in the welding program is not among the possible combinations in the structure of the friction stir welding tool, the NC device determines that it is necessary to exchange the exchange block.

At step S207, when the NC device has determined that the shoulder number or the shoulder symbol of the friction stir welding tool identified in the welding program matches the shoulder number or the shoulder symbol of the friction stir welding tool that is currently mounted on the machining head, the NC device determines that the original friction stir welding tool can be used to perform welding, and the procedure proceeds to the welding operation control sub-routine (SS01).

Then, as described above, at the welding operation control sub-routine SS01, the NC device causes friction stir welding to be performed with respect to the workpieces according to welding parameters set in advance. Thus, the execution of the program is complete.

In contrast, at the above-described step S206 or step S207, when the NC device has determined that the shoulder number or the shoulder symbol of the friction stir welding tool identified in the welding program does not match the shoulder number or the shoulder symbol of the friction stir welding tool that is currently mounted on the machining head, the NC device removes the exchange block from the housing according to the procedure illustrated in FIG. 12 (step S208). Next, the NC device mounts the other exchange block identified in the welding program onto the housing (step S209).

After the another exchange block is mounted onto the housing of the machining head at step S209, the NC device determines that the friction stir welding tool identified in the welding program is properly mounted on the machining head, and the procedure proceeds to the welding operation control sub-routine (SS01).

Then, as described above, at the welding operation control sub-routine SS01, the NC device causes friction stir welding to be performed with respect to the workpieces according to welding parameters set in advance. Thus, the execution of the program is complete.

In the flowchart illustrated in FIG. 13, the original housing is used after the pin holder is exchanged. Depending on the thickness, material, and/or other properties of the workpiece to be welded, however, the size of the pin holder with the stir pin on may be changed, which makes it impossible in some cases to mount the pin holder onto the original housing for welding.

In these cases, for example, a step of determining whether the mounted pin holder makes a match for the original housing may be added after step S204 illustrated in FIG. 13. When the determination made is that the pin holder does not make a match for the housing, another housing stocked on the housing storage table may be mounted on the machining head. Then, the procedure proceeds to step S206.

With the configurations and operations illustrated in FIGS. 9 to 13, the friction stir welding tool according to the second embodiment and the machine tool to which the friction stir welding tool is applied have a one-touch configuration to make a connection and a disconnection between the pin holder and the rotation spindle, between the housing and the spindle frame, and between the housing and the exchange block. The one-touch configuration enables the friction stir welding tool and the machine tool to find applications in automatic tool exchange where separate pins and separate shoulders are used.

Also with the friction stir welding tool according to the second embodiment, when the shoulder alone is to be exchanged, with the stir pin, that is, the pin holder unexchanged, it is not necessary to exchange the housing, which is large in weight and size, every time an exchange operation is performed. Instead, it is only necessary to exchange the exchange block containing the shoulder. This configuration reduces the cost for replacements.

In FIGS. 10 and 11, a stock of exchange block is stored in a gripper disposed on the housing storage table. It is also possible to store a stock of exchange blocks in the grippers disposed on the tool magazine illustrated in FIG. 7 and other drawings. This configuration will be described by referring to FIG. 14 as a modification of the second embodiment.

Figure 14:
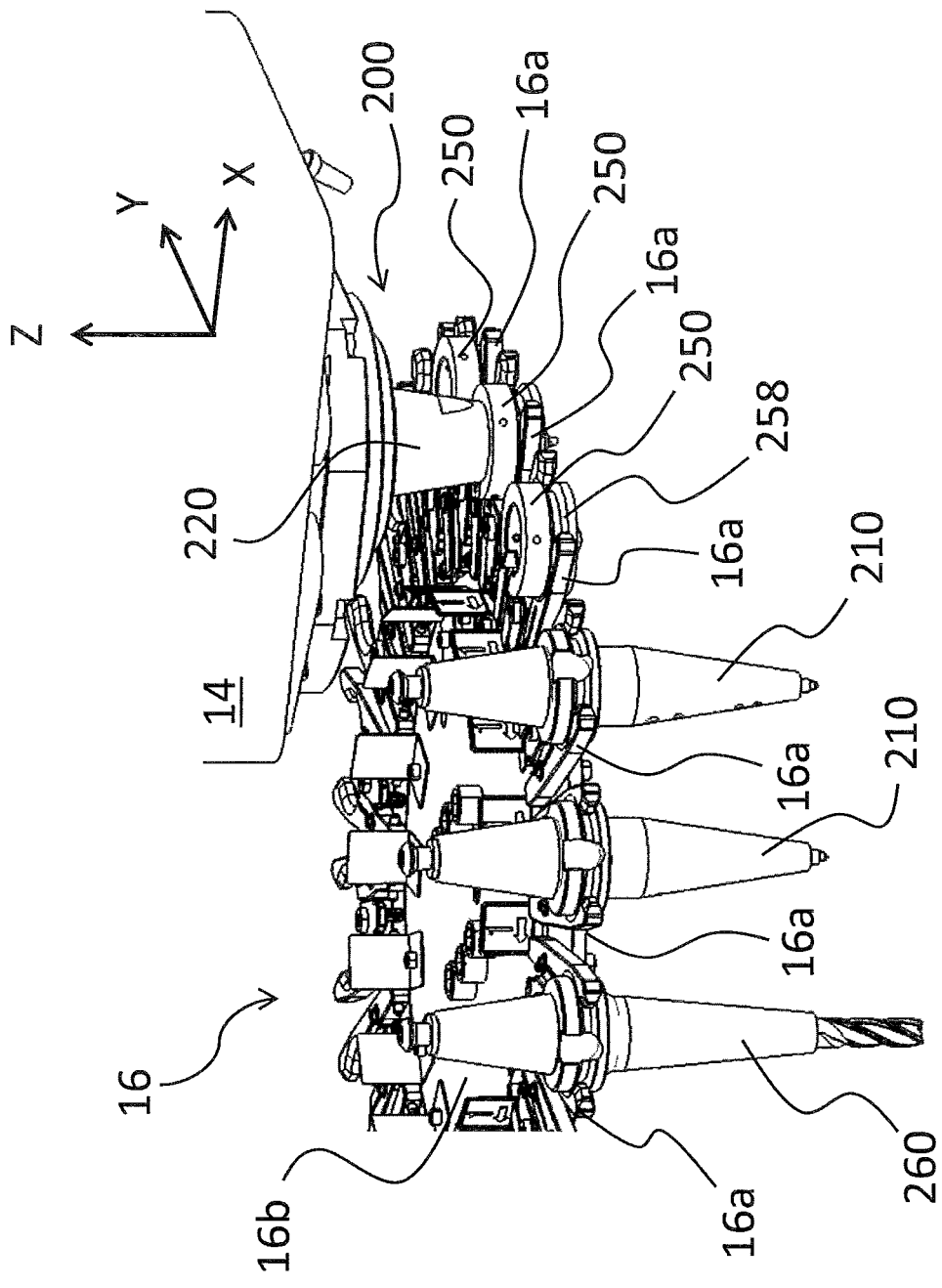
FIG. 14 is a perspective view of the friction stir welding tool according to the second embodiment, the perspective view illustrating a modification of the automatic exchange-block exchange work.

FIG. 14 is a perspective view of the friction stir welding tool according to the second embodiment, the perspective view illustrating a modification of the automatic exchange-block exchange work.

As illustrated in FIG. 14, the plurality of grippers 16a of the tool magazine 16 are mounted on the outer circumference of a circular plate member 16b, which is rotatable on a plane orthogonal to the rotation axis of a rotation mechanism, not illustrated.

The grippers 16a of the tool magazine 16 store a cutting tool holder 260 on which a cutting tool is mounted, and pin holders 210 on which stir pins are mounted. In addition, the grippers 16a store a plurality of exchange blocks 250 of the friction stir welding tool 200. This configuration can be applied to the work of automatically exchanging the exchange block 250 and/or other elements by moving the machining head 14 to cause a gripper 16a to hold the holding groove 258 of an exchange block 250.

This configuration eliminates the need for additional grippers 18f to be provided on the housing storage table 18, and thus simplifies the configuration of the machine tool 1 and reduces the device cost.

Third Embodiment

Next, by referring to FIG. 15, the friction stir welding tool according to the third embodiment and the machine tool to which the friction stir welding tool is applied will be schematically described.

In the third embodiment, the machine tool on which the friction stir welding tool is mounted is similar to that according to the first embodiment illustrated in FIGS. 1 and 2. In the following description, the same elements in these embodiments are assigned the same numerals and/or symbols and will not be elaborated here.

Figure 15B:
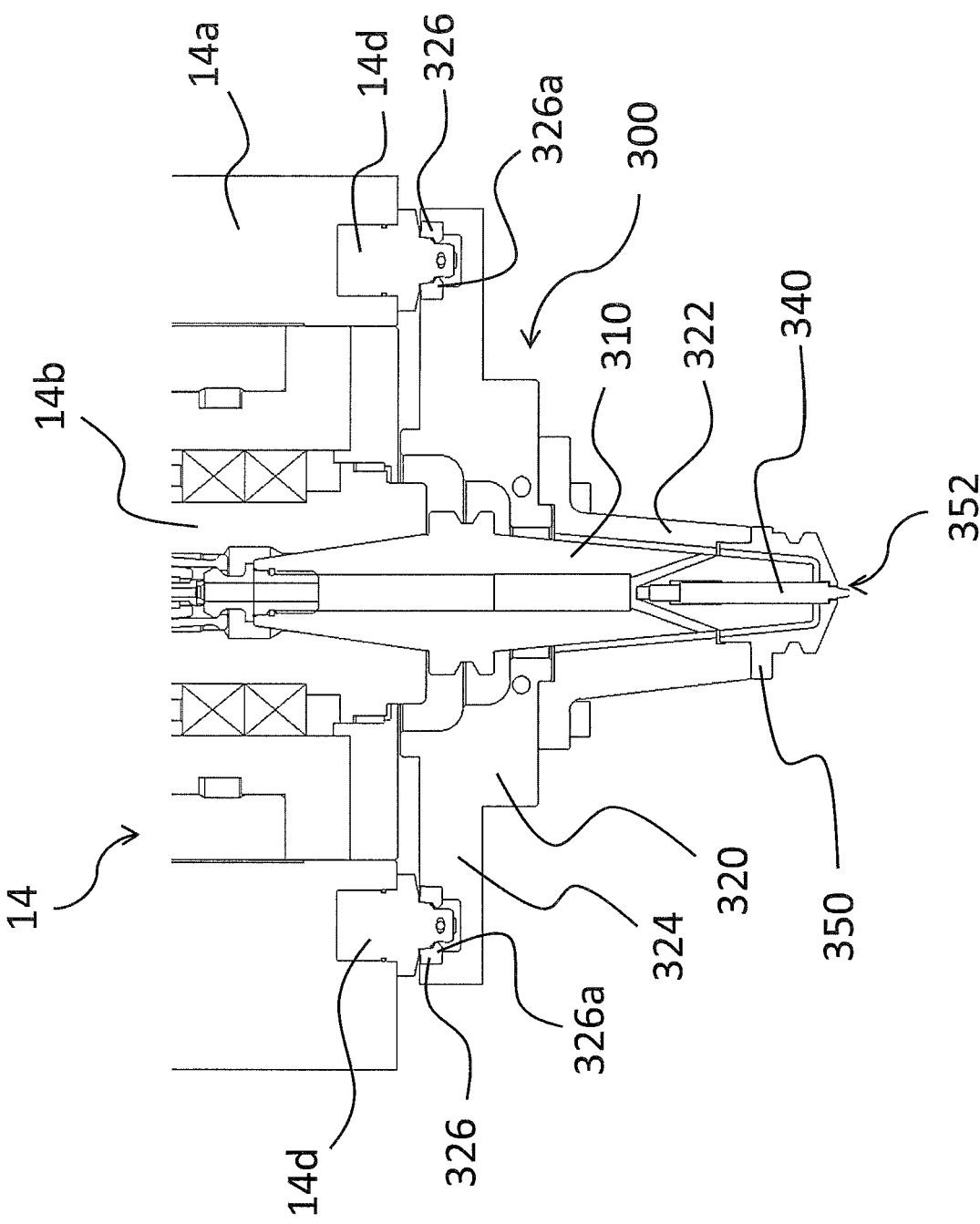
FIG. 15B is a cross-sectional view of a friction stir welding tool according to the third embodiment, the cross-sectional view illustrating in detail the structure that the friction stir welding tool is mounted on the machining head and illustrating a state in which the friction stir welding tool is mounted on the machining head.

FIG. 15A is a cross-sectional view of a friction stir welding tool according to the third embodiment, the cross-sectional view illustrating in detail the structure that the friction stir welding tool is mounted on the machining head. FIG. 15A illustrates a state before the friction stir welding tool is mounted on the machining head. FIG. 15B illustrates a state in which the friction stir welding tool is mounted on the machining head.

Referring to a friction stir welding tool 300 illustrated in FIG. 15A, a plurality of locating rings 326 are formed on the upper surface of a plate portion 324 of a housing 320. The plurality of locating rings 326 each have a hole to be engaged with the spindle frame 14a. On the inner surface of the hole of each locating ring 326, an internally-protruding and ring-shaped protrusion 326a is formed.

Similarly to the second embodiment, an exchange block 350 is mounted on one end of a cylindrical portion 322 of the housing 320. The exchange block 350 is attachable to and detachable from the one end of the cylindrical portion 322.

On the lower surface of the spindle frame 14a of the machining head 14, mounting portions 14d (an example of which is commercially known by the name "Pallet Clamp") are mounted at positions corresponding to the plurality of locating rings 326. The mounting portions 14d are to be engaged with the ring-shaped protrusions 326a, which are formed on the inner surfaces of the locating rings 326.

As illustrated in FIG. 15B, the plurality of mounting portions 14d, which are disposed on the spindle frame 14a, are fitted with the ring-shaped protrusions 326a of the plurality of locating rings 326 of the housing 320. Thus, the housing 320 is mounted on and fixed to the spindle frame 14a.

Each of the mounting portions 14d has such a structure that the protrusion is caused to reciprocate upon application of pressure such as hydraulic pressure. By the application of the pressure, the engagement is released between the mounting portion 14d and the ring-shaped protrusion 326a, which is on the inner surface of the locating ring 326. In this manner, the housing 320 is readily removed.

Thus, the plurality of locating rings 326, which are formed on the plate portion 324 of the housing 320, constitute engaging portions that are engaged with the plurality of mounting portions 14d, which are disposed on the spindle frame 14a.

As illustrated in FIG. 15A, the friction stir welding tool 300 according to the third embodiment is implemented by such a configuration that a stir pin 340, which is mounted on the leading end of a pin holder 310, protrudes through a through hole 352 of the exchange block 350, which is mounted on one end of the housing 320.

Also, similarly to the first embodiment, a gap G is defined between the inner surface of the cylindrical portion 322 of the housing 320 and the outer surface of a holder body 312 of the pin holder 310 when the cylindrical portion 322 and the holder body 312 meet at their normal positions.

This configuration makes a shoulder 354, which is formed on the exchange block 350 of the housing 320, non-rotatable relative to the workpieces W and makes the stir pin 340, which is mounted on the pin holder 310, rotatable relative to the shoulder 354.

With these configurations of the friction stir welding tool according to the third embodiment, the engaging portions disposed on the housing side are formed as holes to receive the mounting portions disposed on the spindle frame side. This reduces the weight of the housing itself and the weight of the friction stir welding tool as a whole, including the housing.

Additionally, since each engaging portion is a depression having the form of a hole, no objects protrude from the upper surface of the plate portion of the housing when, for example, the housing is removed and stored on the housing storage table. This configuration reduces collision and other kinds of risk associated with the movement of the machining head in the vicinity of the housing storage table.

Fourth Embodiment

Next, by referring to FIG. 16, schematic description will be made below with regard to welding control including automatic tool exchange performed by the machine tool to which the friction stir welding tool according to the fourth embodiment is applied.

In the fourth embodiment, the friction stir welding tool and the machine tool on which the friction stir welding tool is mounted are similar to those according to the first to third embodiments. In the following description, the same elements in these embodiments are assigned the same numerals and/or symbols and will not be elaborated here.

Figure 16:
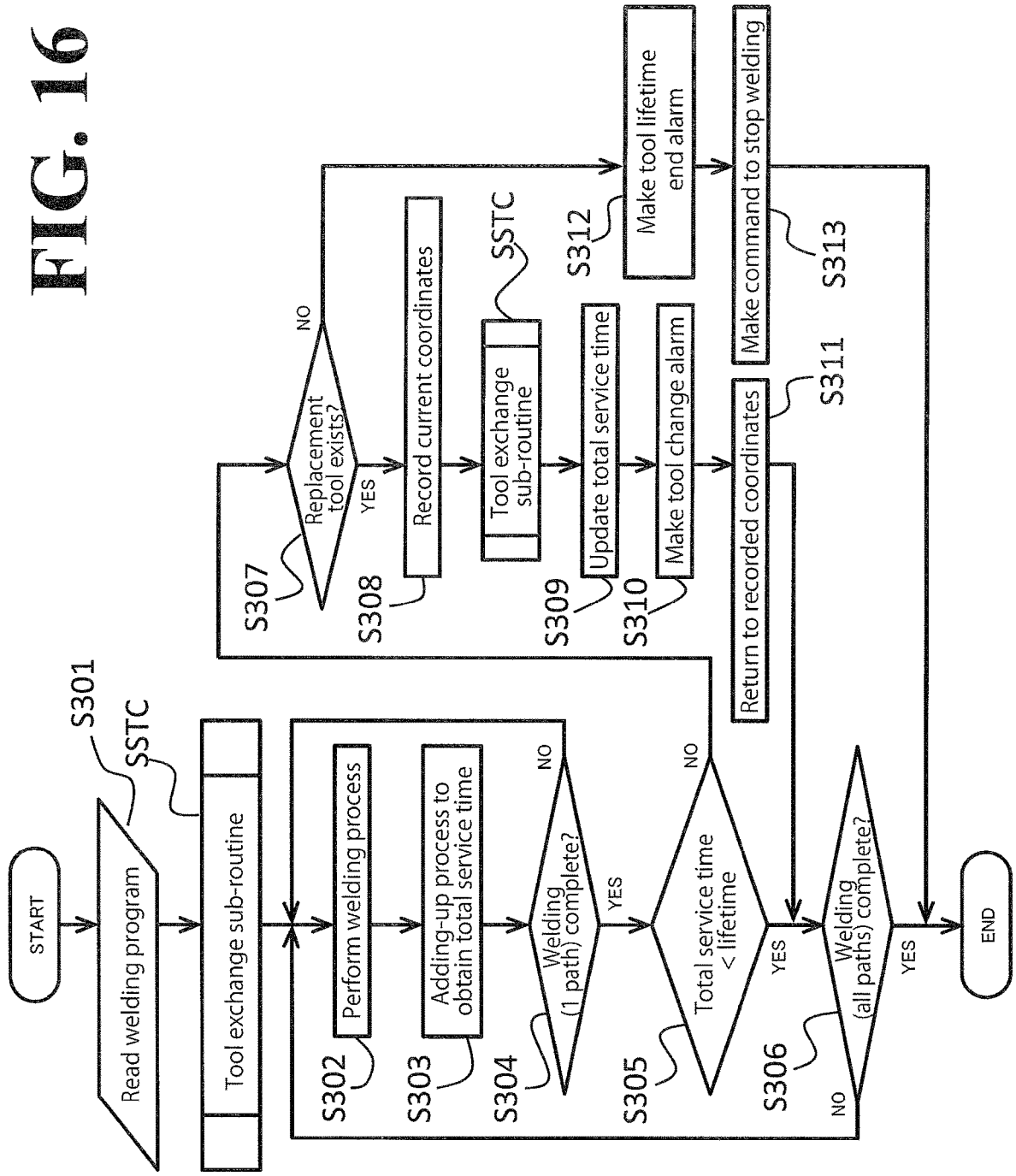
FIG. 16 is a flowchart of an example of welding work including automatic tool exchange in a machine tool to which the friction stir welding tool according to the fourth embodiment is applied.

FIG. 16 is a flowchart of an example of welding work including automatic tool exchange in the machine tool to which the friction stir welding tool according to the fourth embodiment is applied.

Similarly to the first embodiment, the flowchart illustrated in FIG. 16 according to the fourth embodiment is under the assumption that the stir pins and the shoulders are each assigned a unique number or a unique symbol in advance.

As illustrated in FIG. 16, the NC device, which is contained in the human-machine interface 30 of the machine tool 1 illustrated in FIG. 1, first reads from a built-in memory a welding program suitable for the current workpieces W (step S301).

Next, the NC device performs a tool exchange sub-routine based on the stir pin number or the stir pin symbol and the shoulder number or the shoulder symbol of the friction stir welding tool contained in the welding program that has been read. The tool exchange sub-routine is an automatic exchange operation for the combination of the stir pin and the shoulder of the identified friction stir welding tool (sub-routine SSTC).

As used herein, the "tool exchange sub-routine" corresponds to, for example, the operation at steps S102 to S109 illustrated in FIG. 8 according to the first embodiment or the operation at steps S202 to S209 illustrated in FIG. 13 according to the second embodiment. These steps, however, are not intended in a limiting sense.

Next, the NC device performs a welding process based on various welding parameters contained in the welding program that has been read (step S302).

In this respect, the welding program includes: friction stir welding performed with respect to a plurality of positions on a workpiece through a plurality of paths; and friction stir welding performed with respect to a combination of a plurality of workpieces each under the same welding conditions through a plurality of paths. At step S302, welding through one of the plurality of paths is performed.

Next, the NC device performs an adding-up process to obtain the total service time for which the friction stir welding tool currently mounted on the machining head has been used (step S303).

As used herein, the "total service time" refers to a total period of time, added up by a timer or a similar device, for which the stir pin or the shoulder of a friction stir welding tool newly mounted on a machine tool has been in contact with the workpiece. For example, the period of time for contact between the friction stir welding tool and the workpiece is counted on a single-path basis, and after completion of the welding, the sum of the periods of time for contact for the plurality of paths is used as the total service time.

Next, based on the welding parameters contained in the welding program, the NC device determines whether the welding on the first path has ended (step S304).

At step S304, when the NC device has determined that the welding on the first path has not ended yet, the path number remains unchanged and the procedure returns to step S302, where the welding continues.

At step S304, when the NC device has determined that the welding on the first path has ended, the NC device determines whether the total service time so far of the friction stir welding tool currently mounted on the machining head is shorter than a predetermined lifetime (step S305).

As used herein, the "predetermined lifetime" is set as the lifetime of the friction stir welding tool as a whole. It is also possible to set the lifetime individually for the stir pin and for the shoulder of the friction stir welding tool and to obtain the total service time individually.

At step S305, when the NC device has determined that the total service time so far of the friction stir welding tool currently mounted on the machining head is shorter than the predetermined lifetime, the NC device determines that the currently used friction stir welding tool can be continuously used, and the procedure proceeds to step S306.

At step S305, when the NC device has determined that the total service time so far of the friction stir welding tool currently mounted on the machining head is longer than the predetermined lifetime, the NC device determines that the currently used friction stir welding tool is reaching the end of its lifetime, leaving a possibility of being damaged eventually or a possibility of already being damaged due to the welding, and determines that the currently used friction stir welding tool needs replacing. Then, the procedure proceeds to step S307.

At step S307, the NC device determines whether a replacement for the friction stir welding tool currently mounted on the machining head exists on the tool magazine and the housing storage table disposed on the machine tool. The replacement includes a pin holder on which a stir pin is mounted and a housing (or exchange block) on which a shoulder disposed.

In this example, whether the replacement friction stir welding tool exists is determined based on the existence of both the pin holder and the housing (or exchange block). It is also possible to determine whether either a pin holder or a housing (or exchange block) suitable as a replacement exists, when the pin holder and the housing (or exchange block) are intended to be exchanged individually.

At step S307, when the NC device has determined that a pin holder and a housing (or exchange block) that can replace the current friction stir welding tool exist on the tool magazine and the housing storage table, the NC device memorizes the current coordinate position of the machining head in the welding program (step S308), and performs a tool exchange sub-routine (SSTC) to exchange the friction stir welding tool.

The tool exchange sub-routine (SSTC) is the same as that performed after step S301.

After the NC device has performed the tool exchange sub-routine (SSTC) to mount a new friction stir welding tool onto the machining head, the NC device updates the parameter of the total service time for the newly mounted friction stir welding tool (step S309).

When the newly mounted friction stir welding tool is an un-welded new product, the NC device sets the total service time at zero. When the newly mounted friction stir welding tool has a history of usage in other welding operations, the NC device accepts data of the total service time obtained in the previous welding operations.

Then, the NC device notifies the operator of the completion of the automatic tool exchange by making an output on the display device of the human-machine interface 30 illustrated in FIG. 1 (step S310).

Then, the NC device returns the machining head to the same position as the coordinate position of the machining head memorized at step S308, which is before the tool exchange (step S311). Then, the procedure proceeds to step S306, where the welding process continues based on the welding program.

At step S307, when the NC device has determined that a pin holder and a housing (or exchange block) that can replace the current friction stir welding tool do not exist on the tool magazine and the housing storage table, the NC device outputs a command to an alarm device, not illustrated, to make an alarm (step S312). Then, the NC device outputs a command to the machine tool to stop the welding (step S313). Thus, the welding process is stopped.

In this respect, it is possible to notify the operator of the lifetime of the tool using the alarm device and to make a notification on the display device of the human-machine interface 30 that the currently used friction stir welding tool is reaching the end of its service life, leaving a possibility of being damaged eventually or a possibility of already being damaged due to the welding When the procedure proceeds to step S306 through step S305 or step S311, the NC device determines whether the paths of the currently performed welding have gone through all the paths included in the welding program.

In this respect, under the assumption that the same welding paths are applied to a plurality of combinations of workpieces, it is possible to make the determination at step S306 based on whether all the combinations of workpieces have been welded.

At step S306, when the NC device has determined that the paths of the currently performed welding have not gone through all the paths included in the welding program, the NC device updates the data of the number of the paths of the welding, and performs the welding process again back at step S302.

At step S306, when the NC device has determined that the paths of the currently performed welding have gone through all the paths included in the welding program, the NC device determines that all of the welding process is complete, and ends the welding program.

With the operation illustrated in FIG. 16 of performing the welding program, the friction stir welding tool according to the fourth embodiment and the machine tool to which the friction stir welding tool is applied are capable of notifying the operator of the remaining lifetime of the friction stir welding tool and automatically exchanging tools to enable the welding to continue while the welding process is in progress automatically based on the welding program.

Additionally, a comparison between the total service time and the lifetime of the friction stir welding tool is performed every time a welding path is complete. This configuration enables transition to the automatic tool exchange process without suspending the welding process in the course of a welding path.

Further, a determination is made on a single-welding-path basis. This configuration makes it easier to identify the welding path where a tool exceeded its lifetime, even if a welding failure should occur due to damage to the friction stir welding tool. This configuration, in turn, makes it easier to identify a welding failure on the workpieces.

Fifth Embodiment

Figure 17:
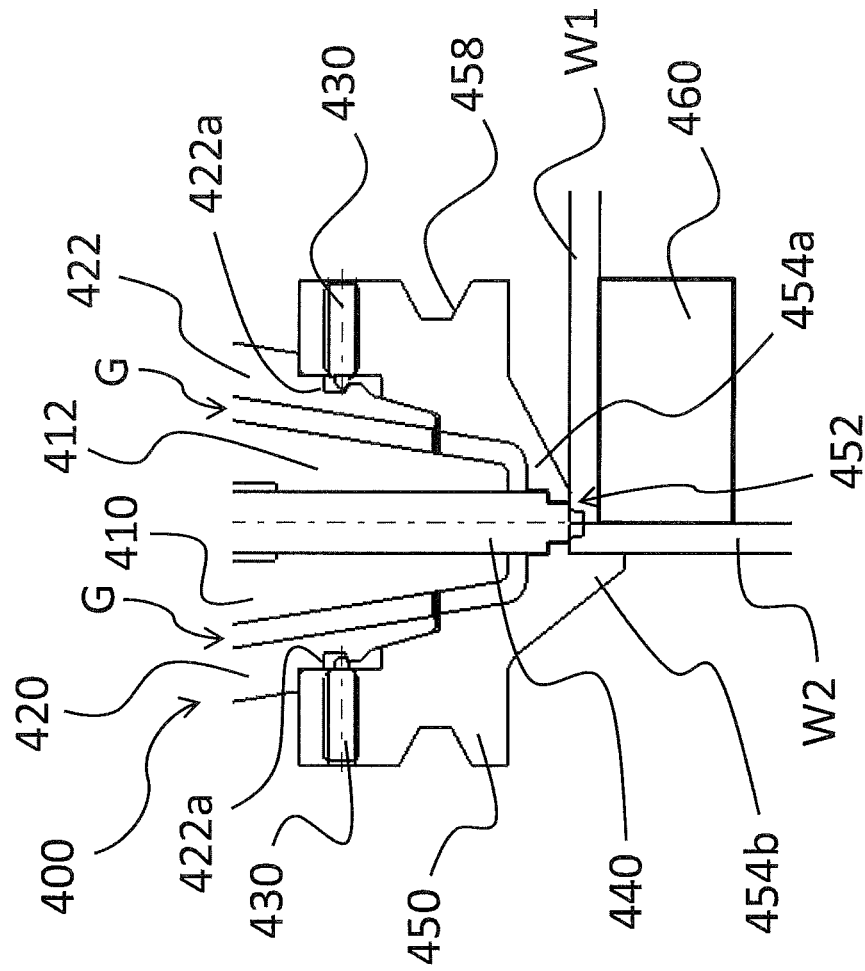
FIG. 17 is a cross-sectional view of a friction stir welding tool according to the fifth embodiment, the cross-sectional view illustrating a relationship between a workpiece and main components of the friction stir welding tool.

Next, by referring to FIGS. 17 and 18, a welding process performed by the machine tool to which the friction stir welding tool according to the fifth embodiment is applied will be schematically described.

In the fifth embodiment, the friction stir welding tool and the machine tool on which the friction stir welding tool is mounted are similar to those according to the first to third embodiments. In the following description, the same elements in these embodiments are assigned the same numerals and/or symbols and will not be elaborated here.

FIG. 17 is a cross-sectional view of the friction stir welding tool according to the fifth embodiment, the cross-sectional view illustrating a relationship between a workpiece and main components of the friction stir welding tool.

Figure 18A:
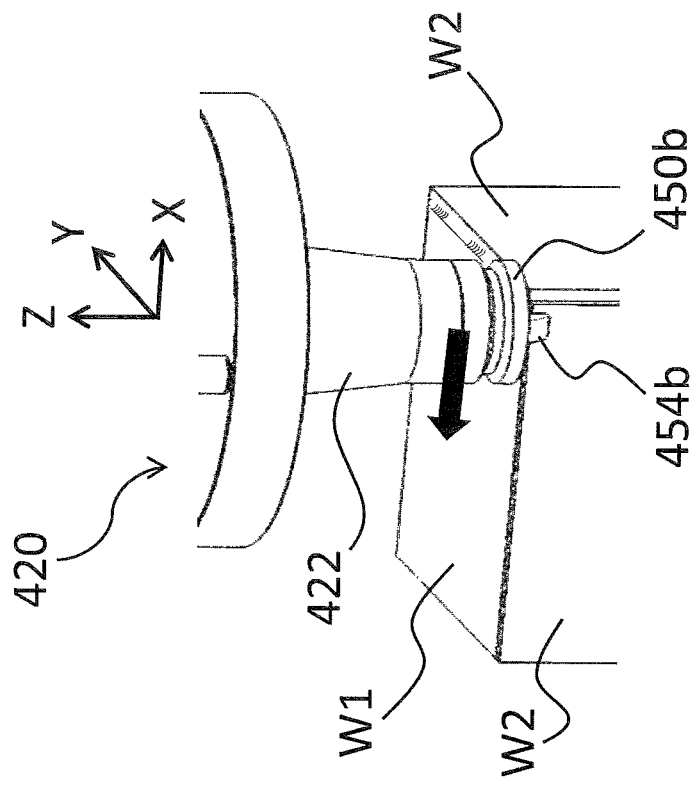
FIG. 18A is a perspective view of the friction stir welding tool according to the fifth embodiment, the perspective view schematically illustrating an operation to weld a first path in friction stir welding performed with respect to a box-shaped workpiece using the friction stir welding tool.
Figure 18B:
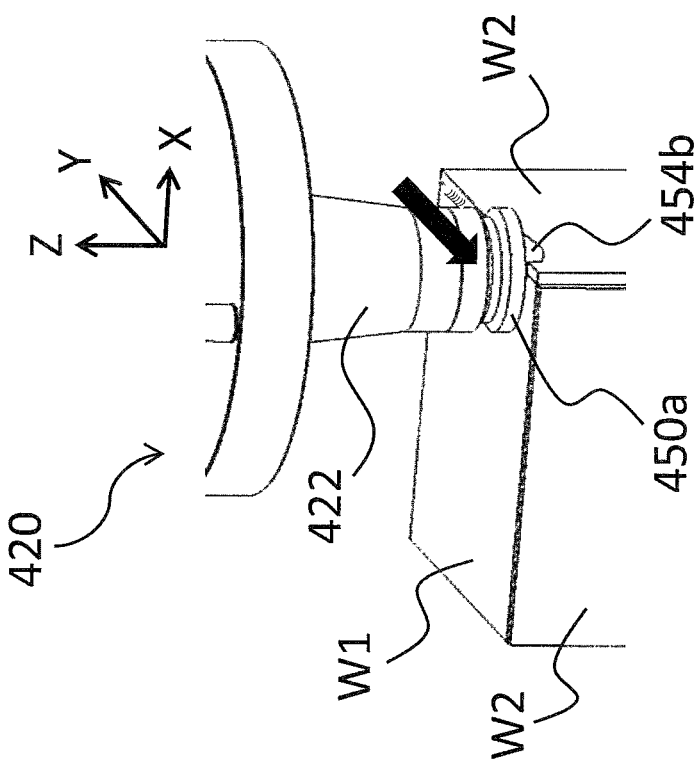
FIG. 18B is a perspective view of the friction stir welding tool according to the fifth embodiment, the perspective view schematically illustrating an operation to weld a second path crossing the first path in the friction stir welding performed with respect to the box-shaped workpiece using the friction stir welding tool.

FIG. 18 is a perspective view of the friction stir welding tool according to the fifth embodiment, the perspective view schematically illustrating friction stir welding performed with respect to a box-shaped workpiece using the friction stir welding tool. FIG. 18A illustrates an operation to weld a first path. FIG. 18B illustrates an operation to weld a second path crossing the first path.

As illustrated in FIG. 17, in the fifth embodiment, friction stir welding is performed with respect to a butting portion defined between a first workpiece W1, which is in contact with the upper surface of a backing jig 460, and a second workpiece W2, which is in contact with a side surface of the backing jig 460.

An exchange block 450 is mounted on one end of a cylindrical portion 422 of the friction stir welding tool through a plurality of engaging means such as ball plungers 430. The exchange block 450 is attachable to and detachable from the one end of the cylindrical portion 422.

The cylindrical portion 422 contains a pin holder 410, with a stir pin 440 mounted on the leading end of the pin holder 410. On the outer circumference surface of the cylindrical portion 422, a plurality of depressions 422a are formed, which receive the leading ends of the ball plungers 430.

The exchange block 450 is a bottomed cylindrical member. On the bottom of the exchange block 450, the exchange block 450 includes: a shoulder 454a, which comes into contact with the first workpiece W1; and a shoulder pad 454b, which extends from a part of the shoulder 454a in the axial direction of the exchange block 450 and which comes into contact with a side surface of the second workpiece W2.

Similarly to the second embodiment, the exchange block 450 includes a holding groove 458, which is to be held by a gripper disposed on the housing storage table or the tool magazine.

Each of the ball plungers 430 has, for example, a bottomed cylindrical body with a spring contained in the body. The spring continually biases a ball toward the outside of the body.

When the cylindrical portion 422 of the friction stir welding tool enters the exchange block 450 through the opening of the exchange block 450, the outer surface of the cylindrical portion 422 contacts the ball plungers 430, causing the balls to reciprocate and to be biased into the depressions 422a. Thus, the balls are fitted with the depressions 422a from outside the depressions 422a, and the exchange block 450 is attachably and detachably fixed to the cylindrical portion 422.

A friction stir welding tool 400 according to the fifth embodiment is implemented by such a configuration that the stir pin 440, which is mounted on the leading end of the pin holder 410, protrudes through a through hole 452 of the exchange block 450, which is mounted on one end of a housing 420.

With this configuration, similarly to the first to third embodiments, a gap G is defined between the inner surface of the cylindrical portion 422 of the housing 420 and the outer surface of a holder body 412 of the pin holder 410. This configuration makes the shoulder 454a and the shoulder pad 454b, which are formed on the exchange block 450 of the housing 420, non-rotatable relative to the workpieces W and makes the stir pin 440 rotatable relative to the shoulder 454a and the shoulder pad 454b.

As illustrated in FIG. 18A, a box-shaped workpiece has four second workpieces W2 on the four side surfaces and a first workpiece W1 on the upper surface. Friction stir welding is performed with respect to a Y-direction welding line defined between the first workpiece W1 and one of the second workpieces W2. The friction stir welding tool 400 used in the welding includes, on the leading end of the cylindrical portion 422, a first exchange block 450a, which includes a shoulder pad 454b. The shoulder pad 454b contacts the second workpiece W2 from the X direction.

As illustrated in FIG. 18B, friction stir welding is performed with respect to an X-direction welding line defined between the first workpiece W1 and another second workpiece W2. The friction stir welding tool 400 used in the welding includes a second exchange block 450b, which has replaced the exchange block 450 illustrated in FIG. 18A. The second exchange block 450b includes a shoulder pad 454b, which is 90° displaced from the exchange block 450 illustrated in FIG. 18A.

With the configurations and operations illustrated in FIGS. 17 to 18, the friction stir welding tool according to the fifth embodiment and the machine tool to which the friction stir welding tool is applied use a housing or an exchange block that includes a shoulder pad, which is an additional shoulder. This enables friction stir welding to be performed with respect to, for example, fillet welded joints of workpieces arranged to form a box shape.

The use of housings or exchange blocks on which the shoulder pads are formed ensures that when a welding line in one direction is changed to another welding line in another direction, the current housing or the current exchange block is automatically exchanged to a housing or an exchange block that includes a shoulder pad that corresponds to the another direction. This configuration, as a result, reduces human labor and step counts.

The present invention will not be limited to the configurations of the above-described embodiments, and various modifications are possible.

For example, in the friction stir welding tools according to the first to fifth embodiments, the means for connecting between the housing and the spindle frame or between the housing and the exchange block has been exemplified as pull studs, a ball-lock pull clamp, and ball plungers. Insofar as the means for connecting provides a one-touch configuration to automatically make a connection and a disconnection, it is possible to use alternative means such as an air damper and an electromagnetic damper.

It is also possible to combine the above-described plurality of kinds of means for connecting when a housing including an exchange block is used.

Further, in the first to fifth embodiments, the stir pin and the shoulder are separate elements. These elements may be made of the same material or different materials.

The stir pin, in particular, has a smaller diameter than the diameter of the shoulder, and using a material greater in strength for the stir pin elongates the lifetime of the stir pin material, resulting in reduced damage.

In contrast, the shoulder is moved while in contact with the workpiece surface in non-rotatable state, and using a material greater in hardness for the shoulder improves the wear resistance of the shoulder.

In this respect, the material of the shoulder may be lighter in weight than steels such as aluminum alloy, and the shoulder's surface to contact the workpiece surface may be coated with ceramic or similar material. This configuration makes the housing as a whole lightweight and wear resistant at the same time.

In the friction stir welding tool according to the fifth embodiment, the shoulder pad protrudes from the shoulder at right angles. The angle defined between the shoulder and the shoulder pad may be less than 90°.

The shoulder pad may be a bearing surface that has a circular shape, for example.

In the welding device recited in Japanese Patent No. 5404389, the pin and the shoulder are separate from the welding device. This configuration enables the length of the pin protruding from the shoulder to be adjusted when the thicknesses of the welded workpieces vary. However, the tool shank holding the pin needs to be mounted on the spindle disposed inside the lower housing in which the shoulder (non-rotatable slide shoulder) is disposed, and it is necessary at the time of exchange of the pin to remove the lower housing fastened to the spindle housing with bolts and associated objects, which involves additional human labor and step counts.

In contrast, in the welding device recited in Japanese Unexamined Patent Application Publication No. 2009-208116, the rotation tool can be automatically exchanged between the spindle unit and the tool magazine of the automatic exchanger, which reduces human labor and step counts. However, the welding device has such a structure that the pin and the shoulder are integral to the rotation tool and that such rotation tool is attached to and detached from the spindle unit. This structure cannot be applied as it is to welding tools in which the pin and the shoulder are separate from the welding tools.

In one embodiment of the friction stir welding tool according to an embodiment, the engaging portion may be a pull stud. In another embodiment of the friction stir welding tool according to an embodiment, the engaging portion may be a locating ring. In the another embodiment, the engaging portion may include a plurality of engaging portions disposed around the cylindrical portion. In the other embodiment, the pin holder may include a holding groove.

In still another embodiment of the friction stir welding tool according to an embodiment, the cylindrical portion of the housing may include an exchange block on which the shoulder is formed. In the still another embodiment, the exchange block may include a holding groove. In the still another embodiment, the exchange block may further include a shoulder pad protruding from the shoulder.

In one embodiment the machine tool according to the present invention, the tool storage may further include a tool magazine in which a stock of the pin holders is stored. In the one embodiment, the cylindrical portion of the housing may include an exchange block on which the shoulder is formed, and a stock of the exchange blocks may also be stored in the tool magazine.

In another embodiment of the machine tool according to the present invention, the NC device may include a welding program and a cutting program, and may be configured to perform automatic exchange to obtain from the tool storage a tool identified in the welding program or the cutting program and configured to perform machining using the tool. In the other embodiment, the welding program may include a datum of an identification number of the stir pin and a datum of an identification number of the shoulder. The NC device may be configured to make an alarm and stop the automatic exchange of the tool when the NC device has determined that a combination of the identification number of the stir pin and the identification number of the shoulder that are identified in the welding program cannot be made using a stir pin mounted on a pin holder among the pin holders stocked in the tool magazine and a shoulder formed on an exchange block among the exchange blocks stocked on the housing storage table. In the other embodiment, the welding program may further include a datum of a lifetime of the stir pin and a datum of a lifetime of the shoulder. The NC device may be configured to keep a total welding time. When the NC device has determined that the total welding time has reached at least one of the lifetime of the stir pin or the lifetime of the shoulder, the NC device may be configured to automatically exchange the pin holder on which the stir pin is mounted or the exchange block on which the shoulder is formed.

With the above-described embodiments, the friction stir welding tool according to an embodiment finds applications in automatic exchange of tools where the pin and the shoulder are separate from the friction stir welding tool. Additionally, the configuration in which an exchange block is mounted on the housing, which is large in weight and size, eliminates the need for exchanging the housing every time an exchange operation is performed. Instead, it is only necessary to exchange the exchange block containing the shoulder. This configuration reduces the cost for replacements. Further, the exchange block can be stored in the tool storage (tool magazine) together with the cutting tool holder and the pin holder.

By applying the friction stir welding tool according to an embodiment to a machine tool, the machine tool is provided with the above-described configurations and capable of automatically exchanging the pin holder and the housing only by a movement of the machining head. This configuration, as a result, reduces human labor and step counts. Additionally, while a welding process is being automatically performed based on the welding program, an operator is notified of the remaining lifetime of the friction stir welding tool, and the tools are automatically exchanged to enable the welding to continue.

Obviously, numerous modifications and variations of the present invention are possible in light of the above teachings. It is therefore to be understood that within the scope of the appended claims, the present invention may be practiced otherwise than as specifically described herein.

What is claimed is:

1. A friction stir welding tool comprising:
   a stir pin having a rotation axis;
   a pin holder supporting the stir pin to rotate with the stir pin around the rotation axis and comprising:
     a holder body;
     a shank configured to be attached to and detached from a rotation spindle; and
     a flange provided between the holder body and the shank to protrude from the holder body in a radial direction perpendicular to the rotation axis, the flange having an outer surface and a groove provided on the outer surface, the groove comprising:
       a bottom;
       a first connection surface connecting the bottom and the outer surface; and
       a second connection surface connecting the bottom and the outer surface opposite to the first connection surface in an axial direction along the rotation axis, the first connection surface being slanted toward the second connection surface, the second connection surface being slanted toward the first connection surface;
   a housing comprising:
     a cylindrical portion through which the pin holder passes;
     a plate portion to be connected to a spindle frame; and
     an engaging portion fixed to an upper surface of the plate portion, the engaging portion being engageable with the spindle frame; and
   a shoulder disposed at one end of the cylindrical portion,
   wherein the pin holder is automatically exchangeable to and from the rotation spindle, and the housing is automatically exchangeable to and from the spindle frame.

2. The friction stir welding tool according to claim 1, wherein a gap is defined between the pin holder and the housing.

3. The friction stir welding tool according to claim 1, wherein the engaging portion comprises a pull stud.

4. The friction stir welding tool according to claim 1, wherein the engaging portion comprises a locating ring.

5. The friction stir welding tool according to claim 1, wherein the engaging portion comprises a plurality of engaging portions disposed around the cylindrical portion.

6. The friction stir welding tool according to claim 1, wherein the cylindrical portion of the housing comprises an attachable and detachable exchange block on which the shoulder is formed.

7. The friction stir welding tool according to claim 6, wherein the exchange block comprises a holding groove.

8. The friction stir welding tool according to claim 7, wherein the exchange block further comprises a shoulder pad extending from a part of the shoulder in an axial direction of the exchange block.

9. A machine tool comprising:
   a spindle frame in which a rotation spindle is disposed;
   a friction stir welding tool mounted on the spindle frame;
   a machining table on which a workpiece is held;
   a tool storage in which the friction stir welding tool is temporarily stored; and
   an NC device configured to control movement of the spindle frame and the machining table,
   wherein the friction stir welding tool comprises:

a pin holder comprising a shank connected to the rotation spindle;
a stir pin mounted on the pin holder; and
a housing comprising:
  a cylindrical portion through which the pin holder is passed; and
  a plate portion connected to the spindle frame,
wherein a shoulder is disposed at one end of the cylindrical portion,
wherein an engaging portion engageable with the spindle frame is fixed to an upper surface of the plate portion, and
wherein the tool storage comprises:
  a tool magazine in which a stock of the pin holders is stored; and
  a housing storage table which is separate from the tool magazine and which is disposed on the machining table.

10. The machine tool according to claim 9,
wherein the cylindrical portion of the housing comprises an exchange block on which the shoulder is formed, and
wherein a stock of the exchange blocks is stored in the tool storage.

11. The machine tool according to claim 10, wherein the NC device comprises a welding program and a cutting program, and is configured to perform automatic exchange to obtain from the tool storage a tool identified in the welding program or the cutting program and configured to perform machining using the tool.

12. The machine tool according to claim 11,
wherein the welding program comprises a datum of an identification number of the stir pin and a datum of an identification number of the shoulder,
wherein the NC device is configured to make an alarm and stop the automatic exchange of the tool when the NC device has determined that a combination of the identification number of the stir pin and the identification number of the shoulder that are identified in the welding program cannot be made using a stir pin mounted on a pin holder among the pin holders stocked in the tool magazine and a shoulder formed on an exchange block among the exchange blocks stocked on the housing storage table.

13. The machine tool according to claim 12,
wherein the welding program further comprises a datum of a lifetime of the stir pin and a datum of a lifetime of the shoulder,
wherein the NC device is configured to keep a total welding time, and
wherein when the NC device has determined that the total welding time has reached at least one of the lifetime of the stir pin or the lifetime of the shoulder, the NC device is configured to automatically exchange the pin holder on which the stir pin is mounted or the exchange block on which the shoulder is formed.

14. The friction stir welding tool according to claim 3, wherein the engaging portion comprises a plurality of engaging portions disposed around the cylindrical portion.

15. A friction stir welding tool comprising:
a stir pin having a rotation axis and including a tip end and a rear end opposite to the tip end along the rotation axis;
a pin holder supporting the stir pin to rotate with the stir pin around the rotation axis and having a front portion and a rear portion opposite to the front portion along the rotation axis, the tip end of the stir pin projecting from the front portion, the rear portion being configured to be attached to and detached from a rotation spindle of a machining tool, the pin holder having a groove between the front portion and rear portion, the groove being configured to be gripped by the machining tool when the rear portion is detached from the rotation spindle; and
a housing housing the pin holder such that the pin holder is rotatable relatively to the housing, the tip end of the stir pin projecting from the housing, the housing comprising an engaging portion engageable with a spindle frame of a machining head, the rotation spindle being rotatable relatively to the spindle frame.

16. The friction stir welding tool according to claim 15, wherein the housing comprises a cylinder through which the pin holder is passed.

17. The friction stir welding tool according to claim 15,
wherein the pin holder is automatically exchangeable to and from the rotation spindle, and
wherein the housing is automatically exchangeable to and from the spindle frame.

18. A machine tool comprising:
a machining head;
a friction stir welding tool comprising:
  a stir pin having a rotation axis and including a tip end and a rear end opposite to the tip end along the rotation axis;
  a pin holder supporting the stir pin to rotate with the stir pin around the rotation axis and having a front portion and a rear portion opposite to the front portion along the rotation axis, the tip end of the stir pin projecting from the front portion; and
  a housing housing the pin holder such that the pin holder is rotatable relatively to the housing, the tip end of the stir pin projecting from the housing, the housing comprising an engaging portion engageable with a spindle frame of the machining head such that the rear portion of the pin holder is attached to a rotation spindle of the machining head to rotate the pin holder, the rotation spindle being rotatable relatively to the spindle frame;
a machining table on which a workpiece is to be provided;
an NC device configured to control movement of the machining head and the machining table;
a tool magazine in which a plurality of pin holders for replacement is stored; and
a housing storage table provided on the machining table and separated from the tool magazine.

* * * * *